United States Patent [19]

Uno et al.

[11] Patent Number: 5,276,733
[45] Date of Patent: Jan. 4, 1994

[54] SYSTEM UTILIZING PORTABLE DEVICE

[75] Inventors: Hiromichi Uno, Yokohama; Yuji Kurosawa, Kawasaki, both of Japan

[73] Assignee: Canon Kabushiki Kaisha, Tokyo, Japan

[21] Appl. No.: 13,220

[22] Filed: Feb. 1, 1993

Related U.S. Application Data

[63] Continuation of Ser. No. 538,762, Jun. 15, 1990, abandoned.

[30] Foreign Application Priority Data

| Jun. 16, 1989 | [JP] | Japan | 1-154161 |
| Jul. 5, 1989 | [JP] | Japan | 1-173700 |
| Jul. 5, 1989 | [JP] | Japan | 1-173701 |
| Jul. 5, 1989 | [JP] | Japan | 1-173703 |

[51] Int. Cl.$^5$ .................................... H04M 11/00
[52] U.S. Cl. ........................ 379/100; 379/355; 379/357
[58] Field of Search ............... 379/100, 110, 102, 104, 379/355, 356, 357, 354, 368

[56] References Cited

U.S. PATENT DOCUMENTS

| 4,126,768 | 11/1978 | Grenzow | 379/357 |
| 4,130,738 | 12/1978 | Sandstedt | 379/355 |
| 4,349,701 | 9/1982 | Snopko | 379/110 |
| 4,356,509 | 10/1982 | Skerlos et al. | 379/110 |
| 4,392,022 | 7/1983 | Carlson | 379/110 |
| 4,427,847 | 1/1984 | Hofmann et al. | 379/110 |
| 4,456,925 | 6/1984 | Skerlos et al. | 379/110 |
| 4,759,056 | 7/1988 | Akiyama | 379/197 |
| 4,766,433 | 8/1988 | Herman et al. | |
| 4,821,107 | 4/1989 | Naito et al. | 358/256 |
| 4,900,902 | 2/1990 | Sakakibara | 379/100 |
| 4,980,910 | 12/1990 | Oba et al. | 379/355 |

FOREIGN PATENT DOCUMENTS

| 0115240 | 8/1984 | European Pat. Off. |  |
| 3803488A1 | 8/1988 | Fed. Rep. of Germany . | |
| 57-173264 | 10/1982 | Japan . | |
| 58-060874 | 11/1983 | Japan . | |
| 59-110258 | 6/1984 | Japan . | |
| 61-152148 | 10/1986 | Japan . | |
| 62-278854 | 3/1987 | Japan . | |
| 62-141837 | 6/1987 | Japan . | |
| 62-77742 | 9/1987 | Japan . | |
| 63-105544 | 5/1988 | Japan . | |
| 63-185157 | 7/1988 | Japan . | |
| 63-275248 | 11/1988 | Japan | 379/368 |
| 1-85458 | 3/1989 | Japan | 379/368 |
| 2-44951 | 2/1990 | Japan | 379/368 |

Primary Examiner—James L. Dwyer
Assistant Examiner—Ahmad F. Matar
Attorney, Agent, or Firm—Fitzpatrick, Cella, Harper & Scinto

[57] ABSTRACT

Call generating apparatus includes a light reception unit and a control unit for acquiring a line and sending a dial signal onto the acquired line in accordance with an output from the light reception unit when a portable device is detected as set in the apparatus. Received or previously stored image data can be printed when an output of the light reception unit coincides with predetermined identification data. A reception error is determined when successive outputs from the light reception unit do not occur within a predetermined time.

20 Claims, 22 Drawing Sheets

FIG. 15
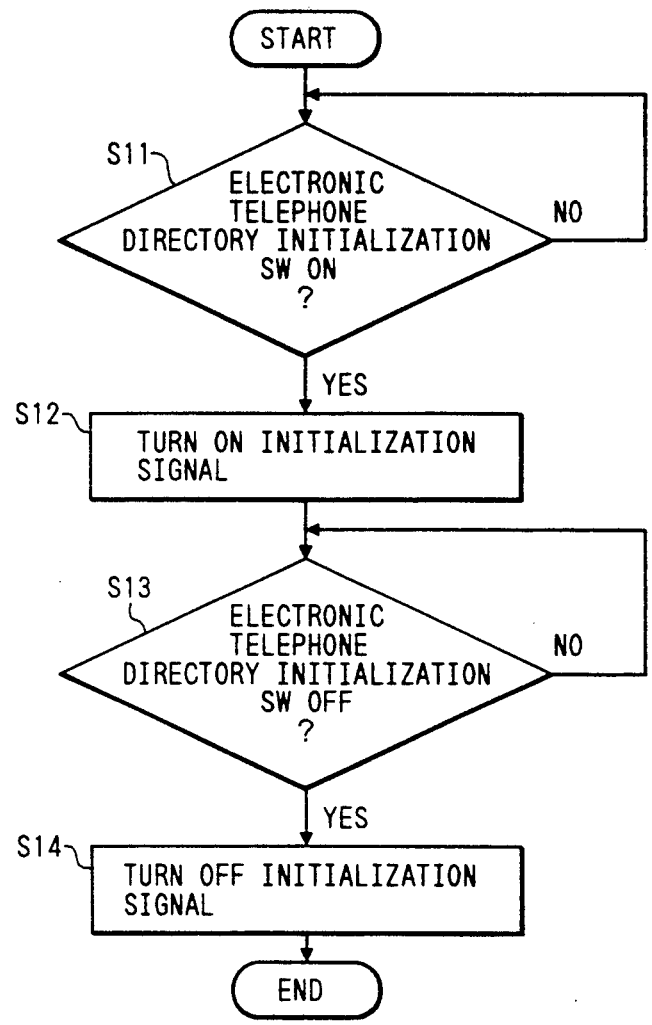
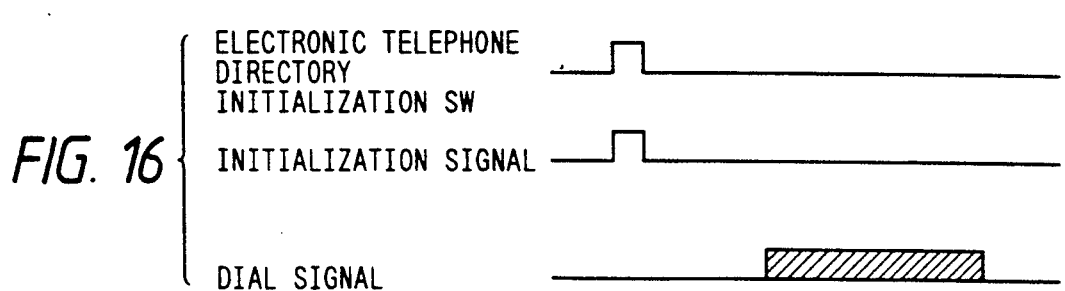
FIG. 16

FIG. 19
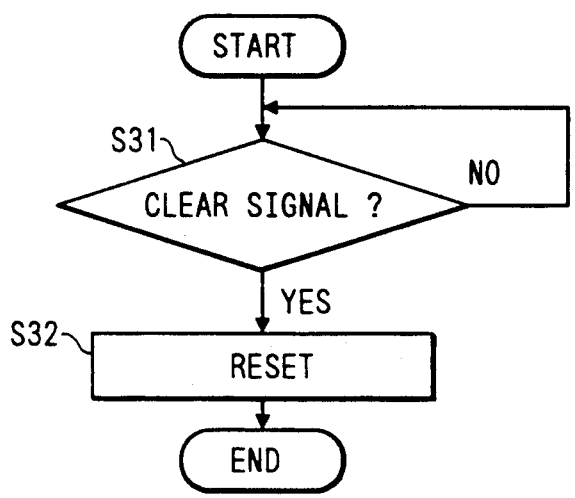
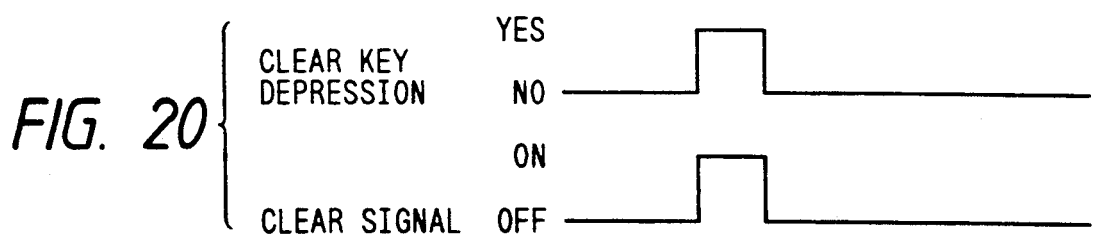
FIG. 20

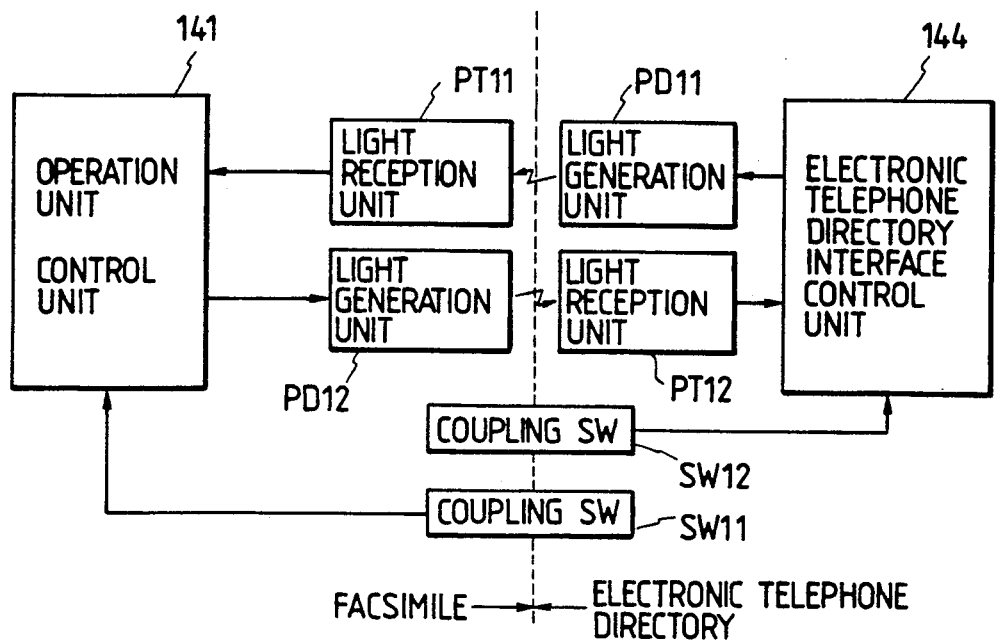
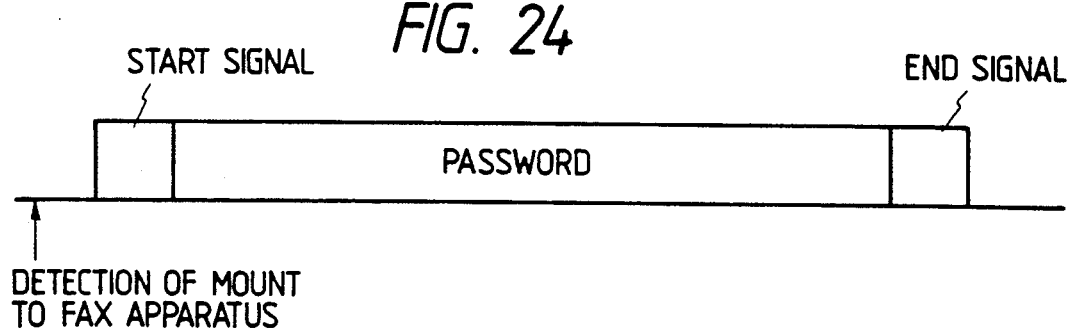
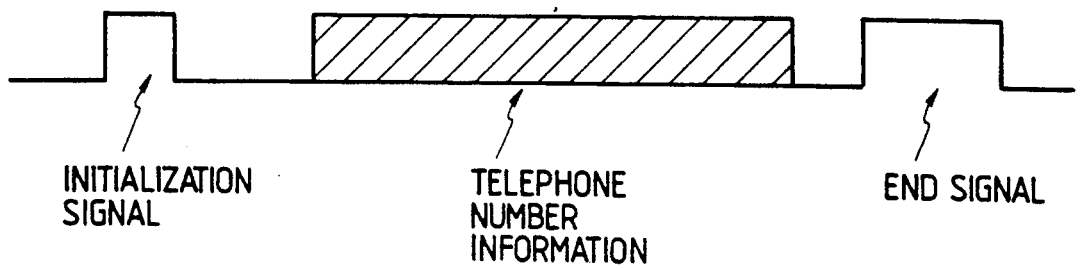

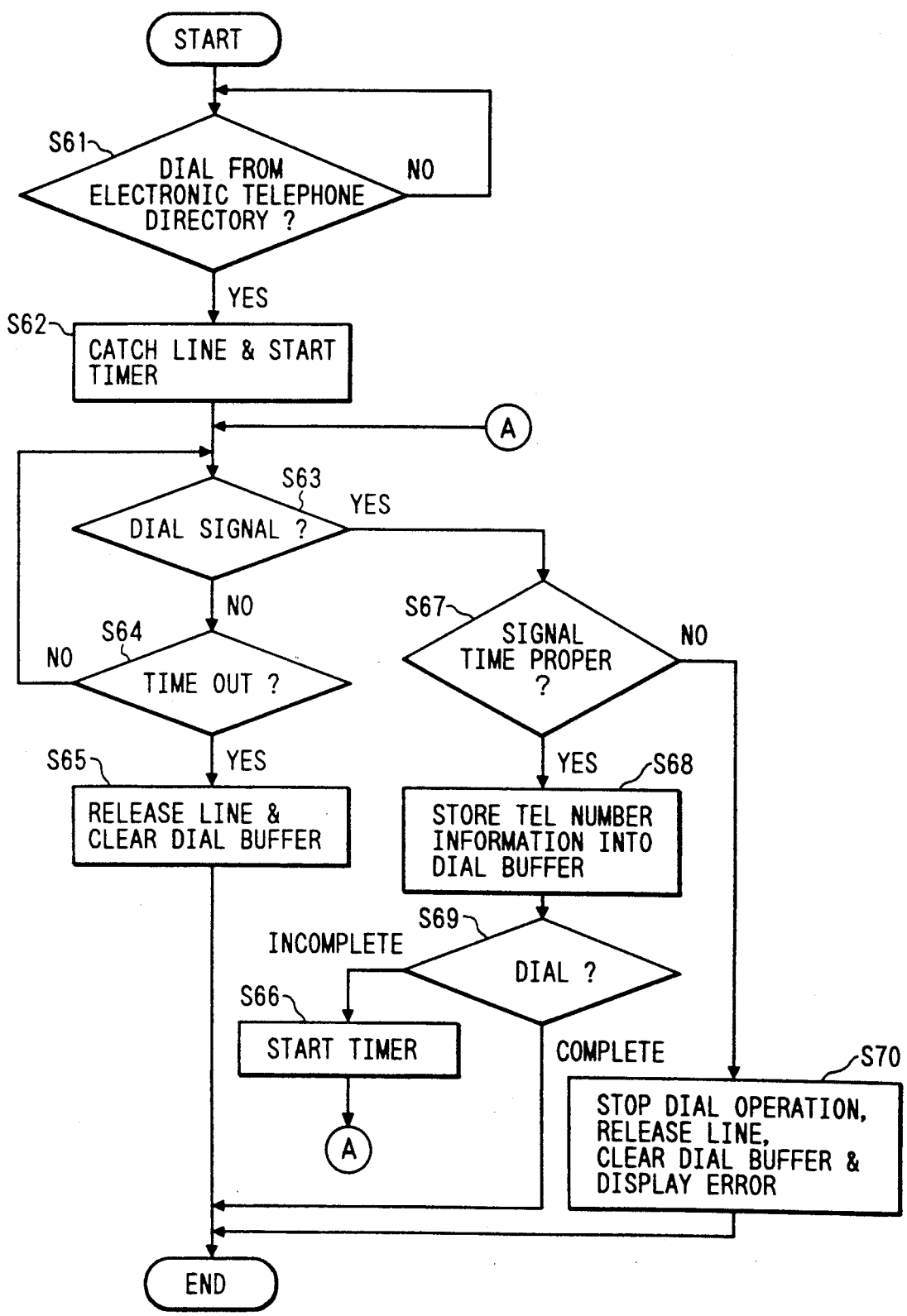

SYSTEM UTILIZING PORTABLE DEVICE

This application is a continuation of application Ser. No. 07/538,762, filed Jun. 15, 1990 (now abandoned).

BACKGROUND OF THE INVENTION

1. Field of the Invention

The present invention relates to a system comprising a portable device storing data such as calling data, identification data, and the like, and an apparatus for receiving data from the portable device and processing the data.

2. Related Background Art

A so-called electronic telephone directory for generating PB (push button) tones according to prestored telephone numbers is known. However, since a device of this type sends the generated PB tone from a speech transmission unit of a handset onto a line, a wrong party may often be called due to noise.

Some telephone sets can be electrically connected to an IC card storing telephone numbers through a connector. However, problems of a connection error of a connector unit, and breaking of pins of the connector unit are posed.

SUMMARY OF THE INVENTION

It is an object of the present invention to improve a communication apparatus.

It is another object of the present invention to improve operability of a system comprising a portable device and a communication apparatus.

It is still another object of the present invention to prevent a call error.

It is still another object of the present invention to provide a data processing apparatus, an image recording apparatus, and a reception apparatus which can reliably receive data such as identification data.

It is still another object of the present invention to improve operability of a portable device.

The above and other objects of the present invention will be apparent from the description of the embodiment.

BRIEF DESCRIPTION OF THE DRAWINGS

FIG. 15 is a flow chart illustrating the operation of the electronic telephone directory of the sixth embodiment;

FIG. 16 is a timing chart of the sixth embodiment;

FIG. 19 is a flow chart of the seventh embodiment;

FIG. 20 is a timing chart of the seventh embodiment;

FIG. 23 is a block diagram of an interface unit according of the ninth embodiment;

FIG. 24 is a timing chart of the ninth embodiment;

FIG. 27 is a timing chart of the tenth embodiment; and

FIG. 28 is a flow chart of the tenth embodiment.

DETAILED DESCRIPTION OF THE PREFERRED EMBODIMENTS

First Embodiment

An IC card of this embodiment has a keyboard including kana keys, alphanumeric keys, and the like, and causes a light-emitting diode matrix to emit light according to a dial number input at the keyboard, thereby transmitting data to a facsimile apparatus. The IC card is detachable with the facsimile apparatus main body.

Figure 1:
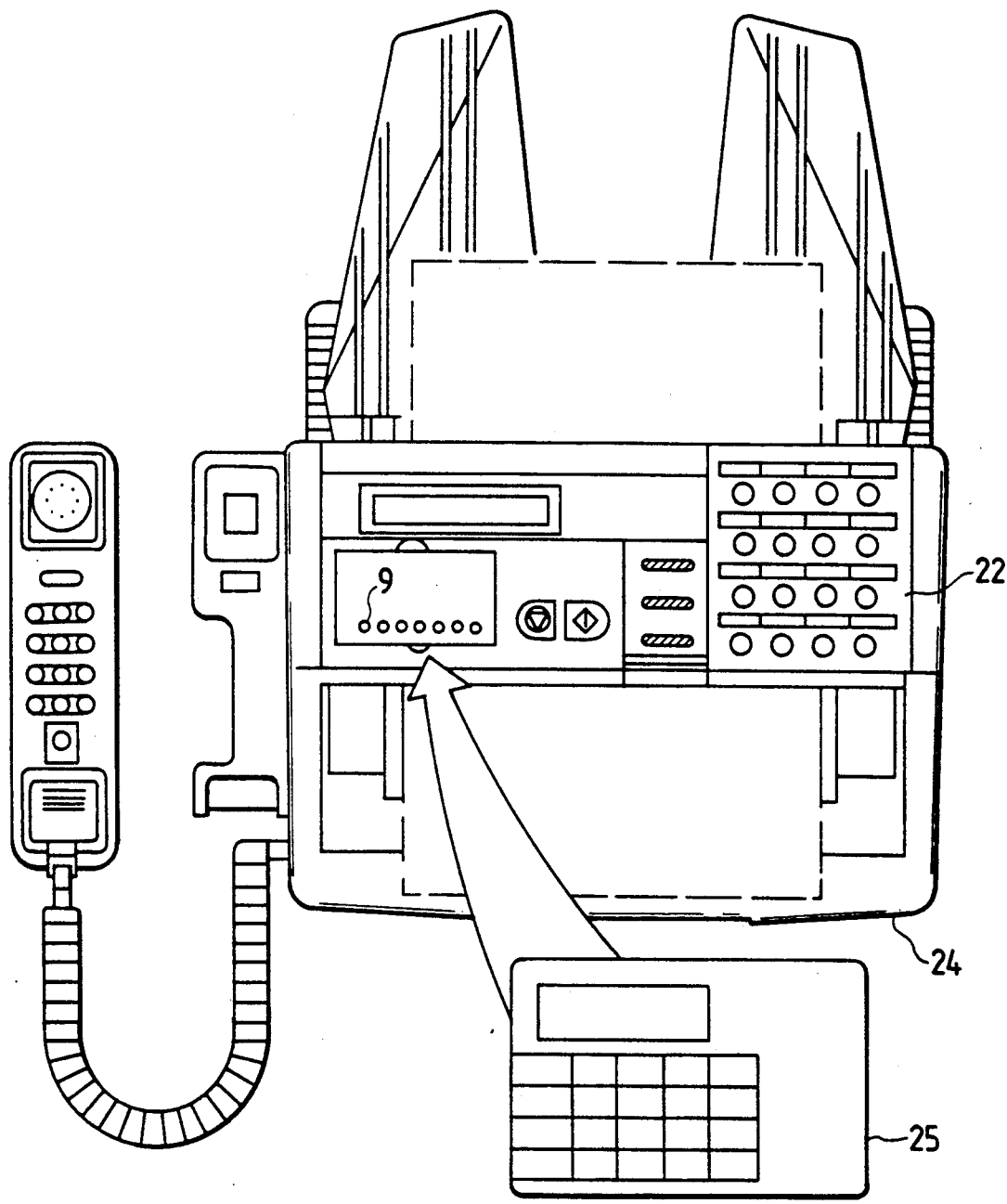
FIG. 1 is a plan view of a facsimile apparatus and an electronic telephone directory according to the first embodiment of the present invention.
Figure 2:
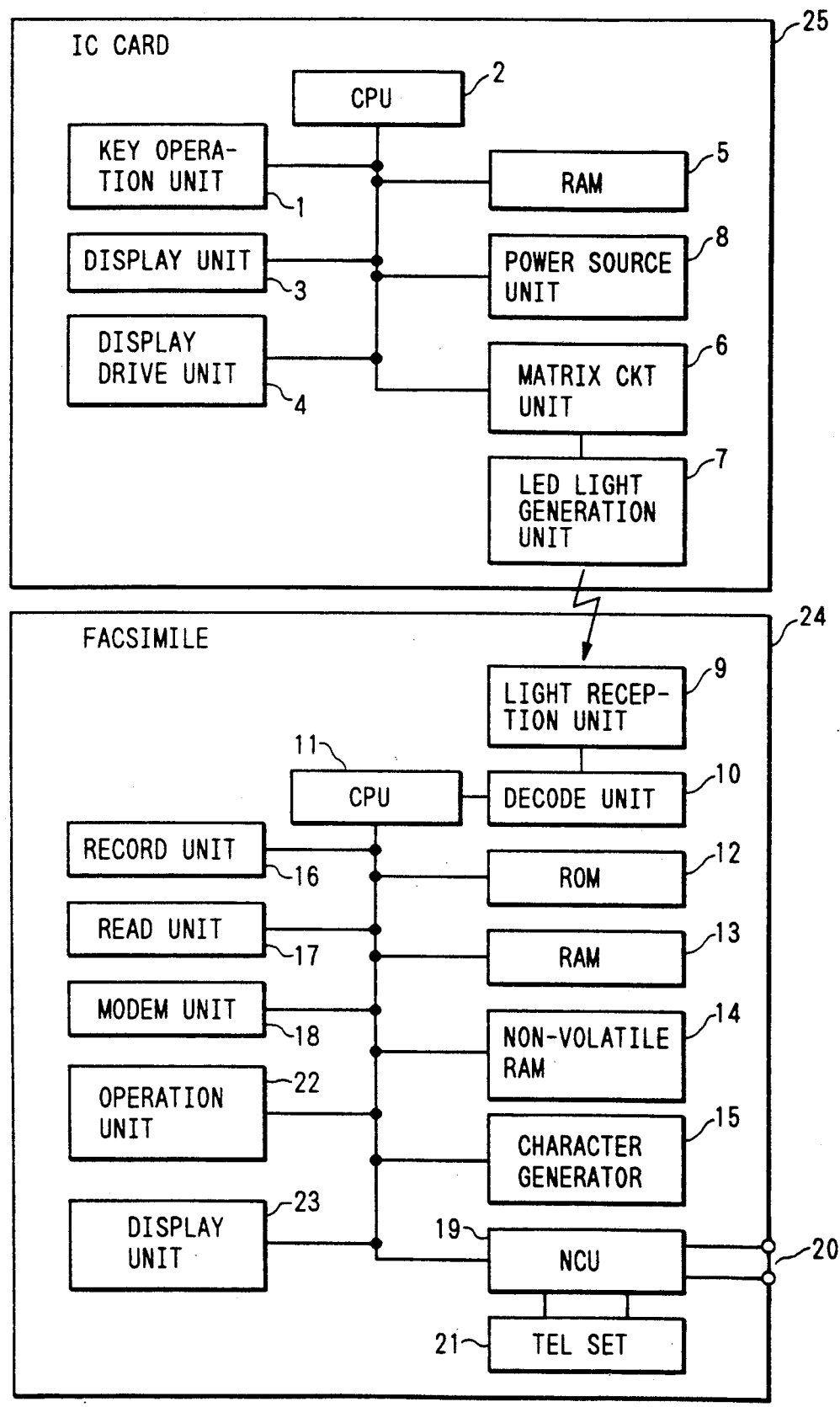
FIG. 2 is a block diagram of a system according to the first embodiment of the present invention.

FIGS. 1 and 2 are respectively a plan view and a block diagram of a system according to the first embodiment of the present invention.

An IC card 25 includes a key operation unit 1, a CPU (central processing unit) 2, a display unit 3, a display drive unit 4, a RAM (random access memory) 5, a matrix circuit unit 6, an LED (light-emitting diode) light generation unit 7, and a power source unit 8.

A facsimile apparatus 24 includes a light reception unit 9, a decode unit 10, a CPU 11, a ROM (read-only memory) 12, a RAM 13, a non-volatile RAM 14, a character generator 15, a record unit 16, a read unit 17, a modem unit 18, a network control unit (NCU) 19, a telephone line 20, a telephone set 21, an operation unit 22, and a display unit 23.

Figure 3:
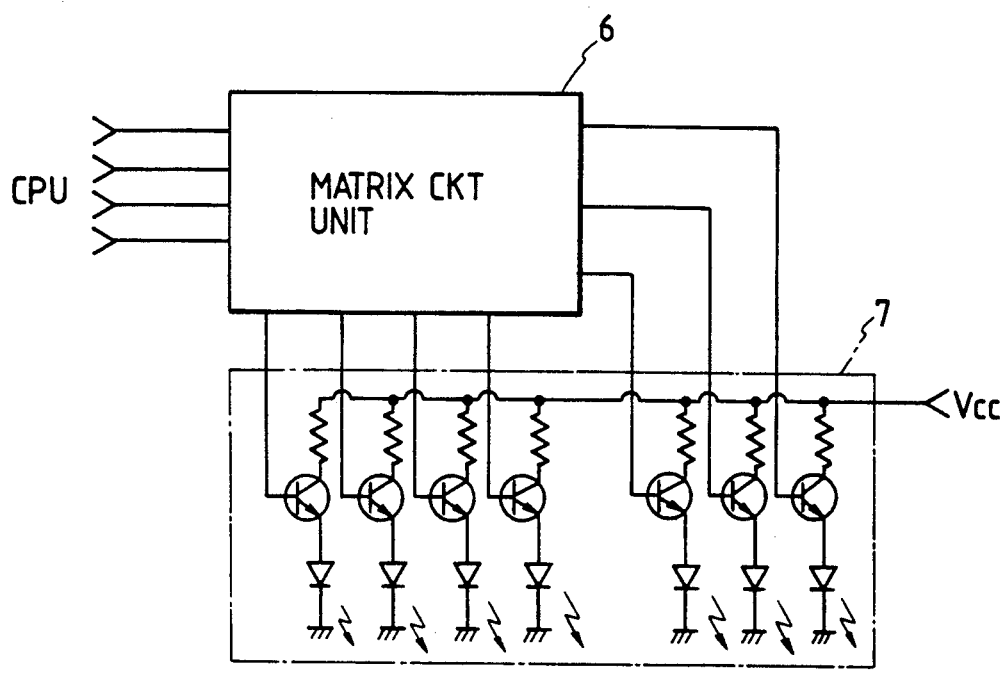
FIG. 3 is a block diagram of an LED light generation unit of the first embodiment.

FIG. 3 is a block diagram of the LED light generation unit 7. The circuit shown in FIG. 3 includes the matrix circuit unit 6 and the LED light generation unit 7.

The CPU 11 controls the overall facsimile apparatus, i.e., the RAM 13, the non-volatile RAM 14, the character generator 15, the record unit 16, the read unit 17, the modem unit 18, the NCU 19, the operation unit 22, and the display unit 23 in accordance with a program stored in the ROM 12.

The RAM 13 stores binary image data read by the read unit 17, or binary image data to be recorded by the record unit 16. The RAM 13 stores binary image data modulated by the modem unit 18 and to be output onto the telephone line 20 via the NCU 19. The RAM 13 stores an analog waveform input from the telephone line 20 via the NCU 19 and demodulated by the modem unit 18 as binary data.

The non-volatile RAM 14 reliably stores data to be preserved when the power source of the facsimile apparatus is turned off. For example, the non-volatile RAM 14 registers destination names and destination telephone numbers input at the operation unit 22 in correspondence with each other.

The CPU 11 transmits a destination name according to an input destination telephone number to a destination receiver on the basis of the program stored in the ROM 12.

The character generator 15 is a ROM for storing characters in JIS codes or ASCII codes. The CPU 11 reads out character data from the character generator 15 using 2-byte data as needed.

The record unit 16 records and outputs recording data stored in the RAM 13 as a hard copy under the control of the CPU 11.

The read unit 17 binarizes read data under the control of the CPU 11, and sequentially sends the binary data to the RAM 13. Note that an original loading state of the read unit 17 can be detected by an original sensor such as a photosensor arranged along a conveyance path of an original. An original detection signal is input to the CPU 11.

The modem unit 18 modulates transmission data stored in the RAM 13 under the control of the CPU 11, and outputs the modulated data onto the telephone line 20 via the NCU 19. The modem unit 18 receives an analog signal on the telephone line 20 via the NCU 19, demodulates and binarizes the received signal, and stores the binary data in the RAM 13.

The NCU 19 selectively connects the telephone line to the modem unit 18 and the telephone set 21 under the control of the CPU 11.

The telephone set 21 is integrated with the facsimile apparatus, and comprises a handset, a speech network, a dialer, a ten-key pad, and the like.

The operation unit 22 includes a key for starting image transmission or reception, a mode selection key for designating an operation mode, e.g., a fine, standard, automatic reception modes, and the like during transmission/reception, a dialing ten-key pad, and the like. The CPU 11 detects depression states of these keys, and controls the corresponding units according to the detected states.

The display unit 23 comprises a liquid crystal display, and displays predetermined characters and the like under the control of the CPU 11.

In the IC card 25, characters, symbols, numerals, and the like are input using keys on the key operation unit 1. The CPU 2 controls the display drive unit 4 to display the key input content on the display unit 3. The RAM 5 stores key input data, and the stored data is read out as needed.

When the LED light generation unit 7 is caused to emit light upon key operations, a signal is sent from the CPU 2 to the matrix circuit unit 6, and the matrix circuit unit 6 then outputs a signal to the LED light generation unit 7, thereby causing the LEDs to emit light. This IC card includes the power source unit 8.

The LEDs of the LED light generation unit 7 emit light according to dial signals, and the light is received by the light reception unit 9. The light reception unit 9 causes the decode unit 10 to decode the received light into a signal to be transmitted to the CPU 11 of the facsimile main body.

In FIG. 3, dial signal data are supplied from the CPU 2. Since there are 12 kinds of dial signals, i.e., 0, 1 to 9, *, and #, 4-bit dial signals are input to the matrix circuit unit 6.

The LED light generation unit 7 expresses 12 kinds of dial signals using seven LEDs. Twelve states can be expressed by a set of three LEDs and a set of four LEDs. As is well known in the art, the combination of one signal from the set of three LEDs and one signal from the set of four LEDs forms a code that produces one of the twelve kinds of dial signals.

As described above, the dial signal is output using the LEDs upon key operations, thus generating a call.

The LED light generation unit 7 may employ LEDs corresponding to the number of LEDs, i.e., 12 LEDs.

The LEDs may be directly driven by the CPU without going through the matrix circuit unit 6.

Since the dial signals are sent in the form of light signals generated by the LEDs, the signals will not be influenced by external noise between the LEDs loaded (i.e., placed on the main body), and a signal exchange error due to directivity will not occur. Therefore, accurate data exchange is allowed. Furthermore, since no contact system such as a connector is employed, wear or contact error caused by detachment/attachment will not occur.

The IC card 25 can be solely carried as a data memory device such as a telephone directory.

When the IC card is loaded by placing the IC card in a terminal device such as a telephone set using a telephone line, the same effect as described above can be obtained.

Second Embodiment

An IC card of this embodiment has a keyboard including kana keys, alphanumeric keys, and the like, converts characters, symbols, or numerals input at the keyboard into corresponding light signals, and outputs them to a telephone set. The IC card of this embodiment is detachable with the telephone set main body.

Figure 4:
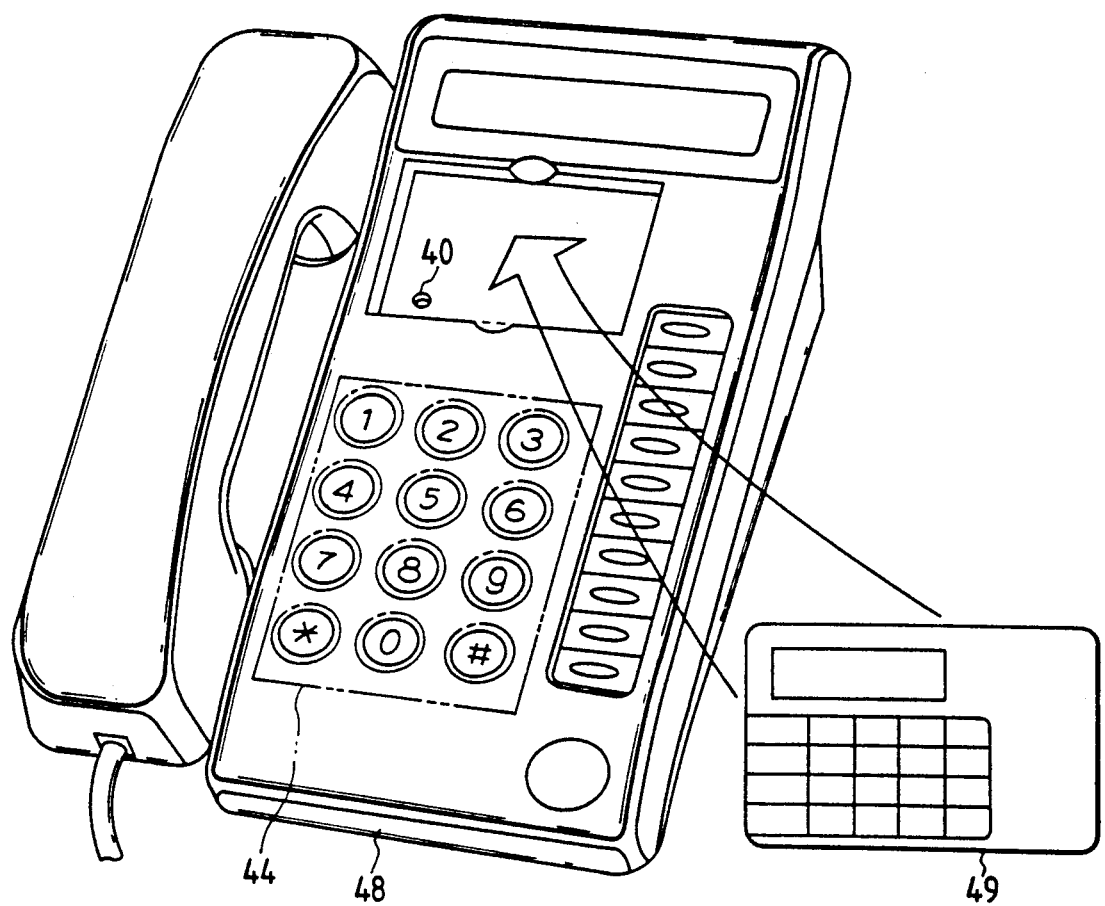
FIG. 4 is a plan view of a telephone set and an electronic telephone directory according to the second embodiment of the present invention.
Figure 5:
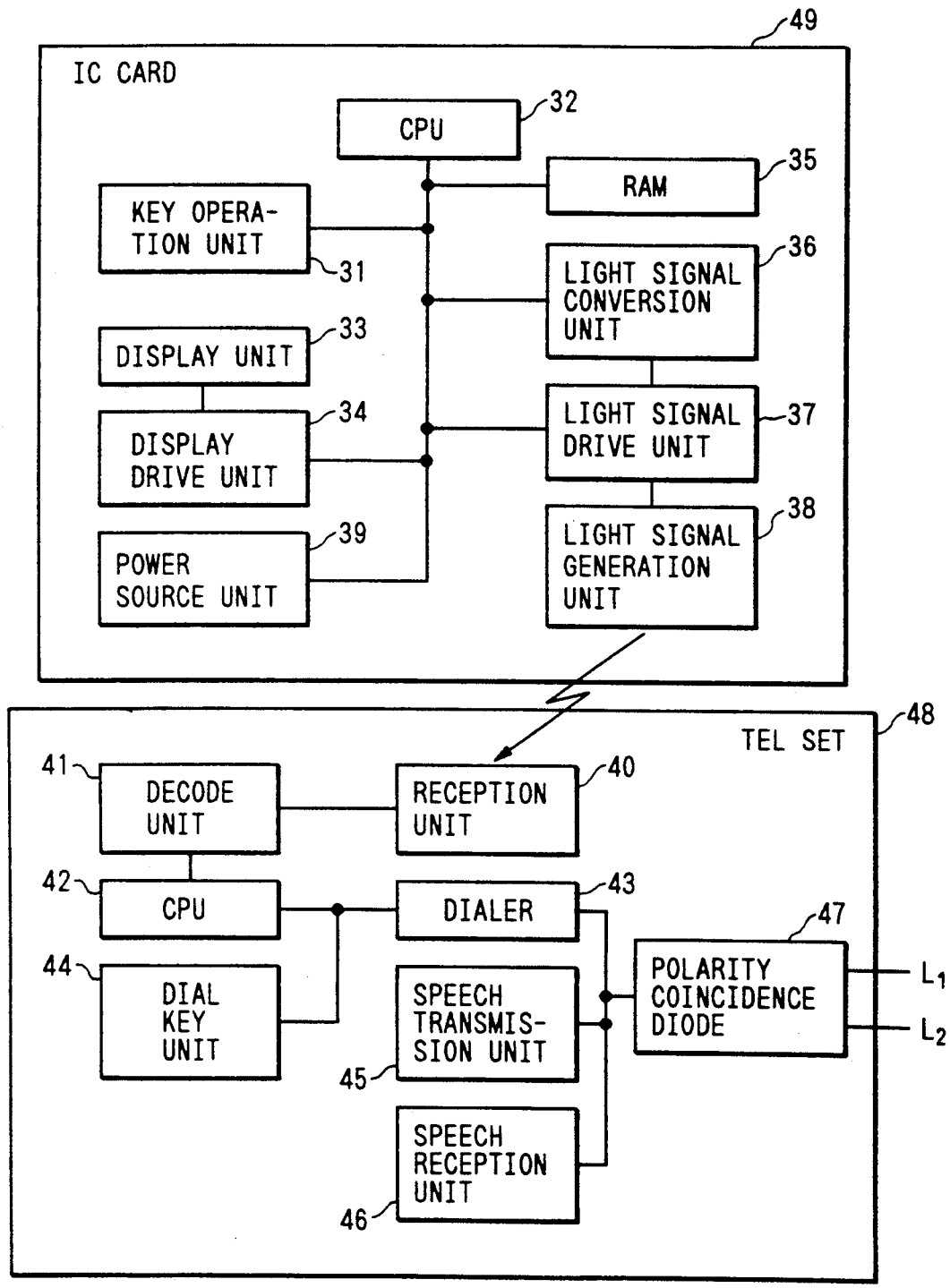
FIG. 5 is a block diagram of a system according to the second embodiment of the present invention.

FIGS. 4 and 5 are respectively a plan view and a block diagram of a system according to the second embodiment of the present invention. An IC card 49 includes a key operation unit 31, a CPU 32, a display unit 33, a display drive unit 34, a RAM 35, a light signal conversion unit 36, a light signal drive unit 37, a light signal generation unit 38, and a power source unit 39. A telephone set 48 includes a reception unit 40 for receiving a light signal generated by the light signal generation unit 38, a decode unit 41, a CPU 42, a dialer 43, a dial key unit 44, a speech transmission unit 45, a speech reception unit 46, and a polarity coincidence diode 47. The telephone set 48 is connected to lines $L_1$ and $L_2$ through the diode 47. An operator inputs characters, symbols, numerals, or the like using keys on the key operation unit 31. The input signal is fetched by the CPU 32. The CPU 32 controls the display drive unit 34 to display the key input content on the display unit 33.

The RAM 35 stores key input data, and the stored data is read out as needed. When the operator operates keys to output a light signal, the CPU 32 sends a signal to the light signal conversion unit 36, and a data format is converted to data to be emitted. A signal is then supplied to the light signal drive unit 37, thus driving the light signal generation unit 38. This IC card includes the power source unit 39.

The telephone set 48 receives a light signal at the reception unit 40, and the decode unit 41 decodes the light signal into a signal to be transmitted to the CPU 42 of the telephone set main body. The CPU 42 operates the dialer 43 according to the received signal, and outputs dial signals onto the lines $L_1$ and $L_2$ via the polarity coincidence diode 47. When the IC card is not used even if it is loaded or not, an operator operates the dial key unit 44 to generate a call. The speech transmission unit 45 and the speech reception unit 46 are used in a line connected state and a speech communication state. In this manner, the telephone set can be controlled by using the light signal.

As described above, since the detachable IC card 49 which can output a light signal is arranged, data communication between the IC card 49 and the telephone set 48 can be performed without being influenced by external noise. In addition, a trouble caused by directivity will not occur.

Furthermore, when the IC card 49 is loaded on a facsimile apparatus, it can send data such as destination names. When the IC card is detached, it can be carried as a data memory card which stores telephone numbers and names.

When infrared light is used in place of a light signal, the same operation can be performed. Furthermore, a radio signal such as an electromagnetic wave may be output to allow the same operation.

Third Embodiment

An IC card 70 of this embodiment has a keyboard 51 including kana keys, alphanumeric keys, and the like, and converts characters, symbols, or numerals input at the keyboard 51 into corresponding radio signals. The IC card superposes a control signal for a reception side equipment such as an off-hook command on the radio signal, and simultaneously outputs these signals.

Figure 6:
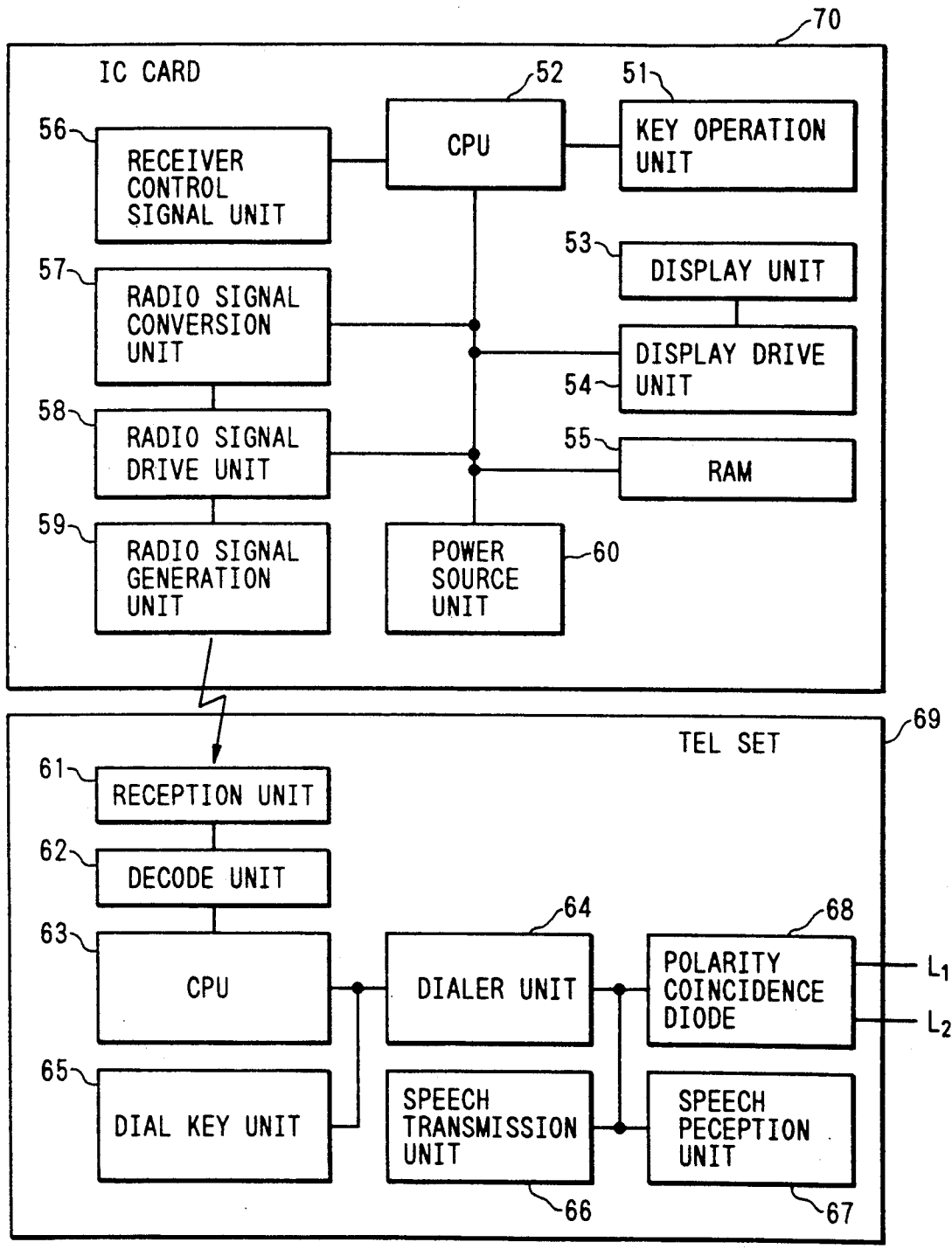
FIG. 6 is a block diagram of a system according to the third embodiment of the present invention.

FIG. 6 shows the third embodiment of the present invention. The IC card 70 shown in FIG. 6 includes the key operation unit 51, a CPU 52 of the IC card 70, a display unit 53, a display drive unit 54, a RAM 55, a receiver control signal unit 56, a radio signal conversion unit 57, a radio signal drive unit 58, a radio signal generation unit 59, and a power source unit 60. A telephone set 69 includes a reception unit 61, a decode unit 62, a CPU 63 of the telephone set, a dialer unit 64, a dial key unit 65, a speech transmission unit 66, a speech reception unit 67, and a polarity coincidence diode 68.

An operator inputs characters, symbols, numerals, or the like using keys on the key operation unit 51. The input signal is fetched by the CPU 52. The CPU 52 controls the display drive unit 54 to display the key input content on the display unit 53. The RAM 55 stores key input data, and the stored data is read out therefrom as needed.

When output of a radio signal is instructed upon key operations, the CPU 52 supplies telephone number data from the RAM 55 and a receiver control signal output from the receiver control signal unit 56 to the radio signal conversion unit 57, thereby converting these signals into a radio signal. The radio signal drive unit 58 drives the radio signal generation unit 59 in accordance with the radio signal converted by the radio signal conversion unit 57.

The telephone set 69 receives the radio signal at the reception unit 61, and the decode unit 62 then decodes the received radio signal into a signal to be supplied to the CPU 63 of the telephone set. The CPU 63 acquires a line on the basis of the receiver control signal of the received signal. Furthermore, the CPU 63 drives the dialer unit 64 on the basis of the telephone number data of the received signal to send dial pulses onto lines $L_1$ and $L_2$ via the polarity coincidence diode 68. When the IC card 70 is not used, an operator inputs a telephone number from the dial key unit 65 to the dialer unit 64. The speech transmission unit 66 and the speech reception unit 67 are used in a line connected state and a speech communication state.

As described above, a system to which the IC card is assembled can be controlled upon key operations at the IC card.

As described above, since the IC card 70 transmits data using a radio signal in a non-contact state with the telephone set 69, mechanical wear caused by detachment/attachment will not occur, and an electrical conduction error of a signal line can be prevented.

Since the IC card 70 can be arbitrarily attached to the telephone set 69, if it is not set on the telephone set 69 the IC card can also be solely used as a data memory such as a telephone directory.

The IC card 70 can be loaded on a facsimile apparatus to provide a one-touch dial function and an abbreviated dial function. In this case, an off-hook signal as a control signal is superposed on an output signal, so that the facsimile apparatus can be controlled upon operations on the IC card.

The IC card can designate a time designated transmission mode. More specifically, the CPU 52 reads out a control signal for designating the time designated transmission mode, a preset transmission time, and a dial number of a destination station from the RAM 53, and transmits them to the facsimile apparatus. The facsimile apparatus receives and stores the signal. When the received preset transmission time coincides with an internal timer, the facsimile apparatus calls the designated dial number, and performs facsimile transmission.

Fourth Embodiment

An IC card 80 of this embodiment has a keyboard 81 including kana keys, alphanumeric keys, and the like. The IC card converts characters, symbols, or numerals input at the keyboard 81 into corresponding radio signals. The IC card superposes a signal for controlling an equipment for receiving the radio signal on the radio signal, and simultaneously outputs these signals. In addition, the IC card also fetches a radio signal from the receiving side equipment, and performs communication with it.

Figure 7:
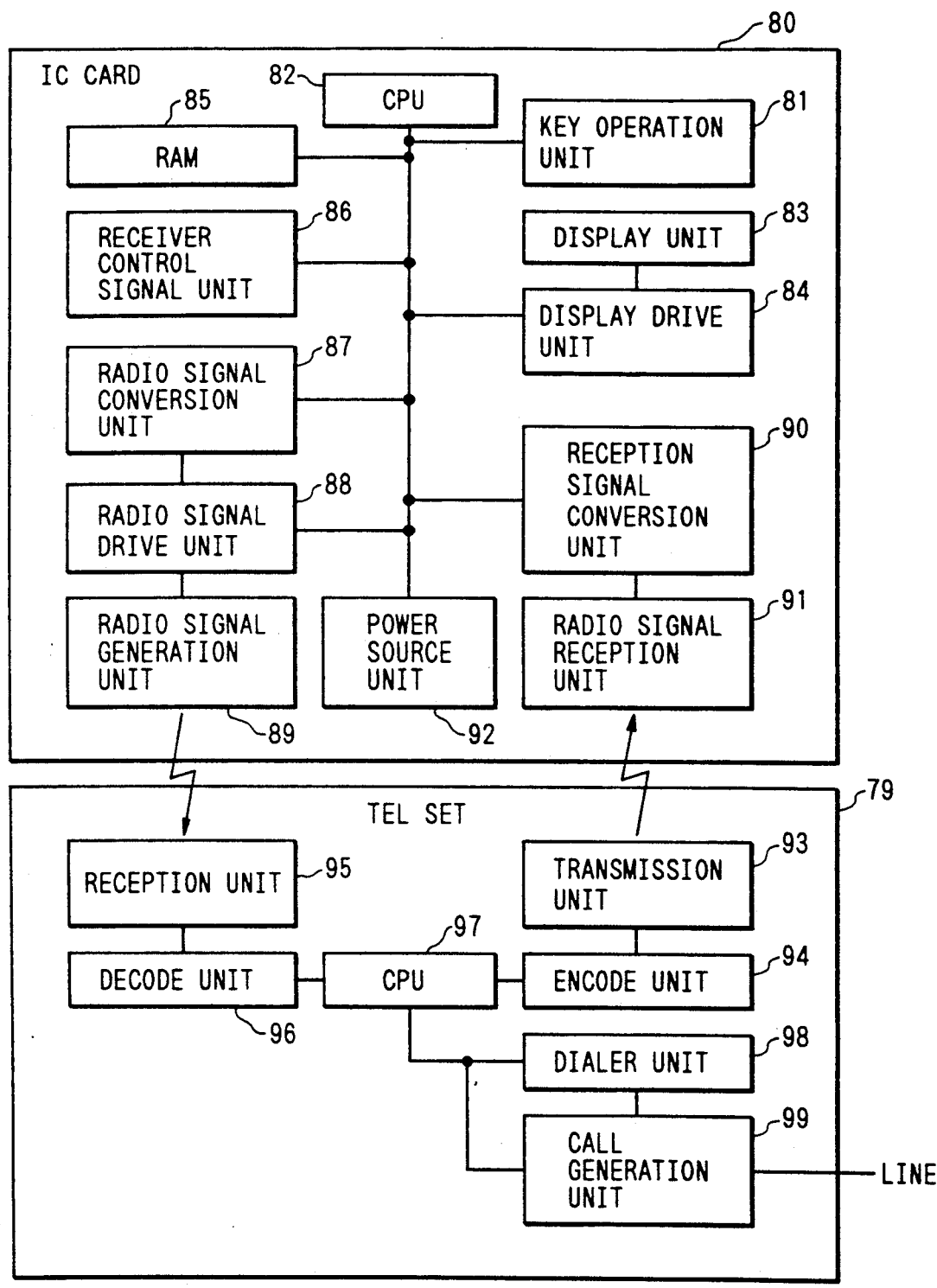
FIG. 7 is a block diagram of a system according to the fourth embodiment of the present invention.

FIG. 7 shows a system arrangement of the fourth embodiment. In FIG. 7, the IC card 80 includes the key operation unit 81, a CPU 82, a display unit 83, a display drive unit 84, a RAM 85, a receiver control signal unit 86, a radio signal conversion unit 87, a radio signal drive unit 88, a radio signal generation unit 89, a radio signal conversion unit 90, a radio signal reception unit 91, and a power source unit 92.

A telephone set 79 is an example of a receiver. The telephone set 79 includes a transmission unit 93, an encode unit 94, a reception unit 95, a decode unit 96, a CPU 97, a dialer unit 98, and a call generation unit 99.

An operator inputs characters, symbols, numerals, or the like using keys on the key operation unit 81. The input signal is fetched by the CPU 82. The CPU 82 controls the display drive unit 84 to display the key input content on the display unit 83. The RAM 85 stores key input data, and the stored data is read out therefrom as needed. When output of a radio signal is instructed upon key operations, the CPU 82 causes the radio signal conversion unit 87 to convert telephone number data in the RAM 85 and a receiver control signal output from the receiver control signal unit 86 into a radio signal. The radio signal drive unit 88 drives the radio signal generation unit 89 in accordance with the radio signal converted by the radio signal conversion unit 87.

When a radio signal is sent from the transmission unit 93 of the telephone set 79, it is received by the radio signal reception unit 91, and is converted by the reception signal conversion unit 90. Thus, the converted signal is fetched by the CPU 82.

The telephone set 79 receives a radio signal transmitted from the IC card 80 at the reception unit 95. The received radio signal is decoded by the decode unit 96 into a signal to be transmitted to the CPU 97. Upon reception of this signal, the CPU 97 catches a line, and operates the dialer unit 98, thus outputting a dial signal, and the like through the call generation unit 99.

The call generation unit 99 supplies, to the CPU 97, information indicating whether or not a called party is connected to a line. This information is modulated by the encode unit 94, and the modulated information is transmitted, as a radio signal, from the transmission unit 93 to the radio signal reception unit 91 of the IC card 80. The CPU 82 causes the radio signal generation unit 89 to transmit an on-hook command when the called party does not respond within a predetermined period of time.

When a call is generated on a line or when a called party does not respond, an operation for engaging or disengaging a line must be performed. Since a receiver control signal is sent in addition to a dial signal, the call generation unit 99 engages/disengages a line in response to the control signal.

As described above, an operation of a system to which the IC card 80 is assembled can be controlled upon key operations on the IC card 80.

When a receiver is a facsimile apparatus and the IC card is loaded on the facsimile apparatus, the IC card can be used to provide a one-touch dial function and an abbreviated dial function. In this case, when a facsimile control signal such as an off-hook signal or a timer setup signal is superposed on an output signal, or when a signal indicating a state of a called party is received from the facsimile apparatus, the facsimile apparatus can be operated upon operation of the IC card.

More specifically, upon reception of the off-hook signal, the facsimile apparatus catches a line, that is, acquires a connection to the line. The facsimile apparatus causes the transmission unit 93 to supply, to the IC card 80, information indicating that the line is caught. On the other hand, when the IC card 80 detects information indicating that the line is caught, it causes the transmission unit 89 to transmit a dial signal. The facsimile apparatus generates a call on the basis of a number received at the reception unit 95, and performs facsimile communication.

In this manner, when the IC card is set on a communication equipment, it communicates with the communication equipment. Thus, the IC card can check reception of data from the communication equipment and can detect an operation content of the communication equipment. More specifically, the IC card can detect that the communication equipment receives data. Therefore, the IC card can determine whether or not data is to be retransmitted or the next data can be transmitted, and can execute preferred processing according to the determination result.

Fifth Embodiment

An electronic telephone directory of this embodiment adds and transmits a signal corresponding to "*" or "#" prior to transmission of a dial signal. Upon first reception of the signal corresponding to * or #, a communication apparatus waits for the dial signal from the electronic telephone directory.

Furthermore, upon first reception of the signal corresponding to * or #, the communication apparatus of this embodiment engages a telephone line.

Figure 8:
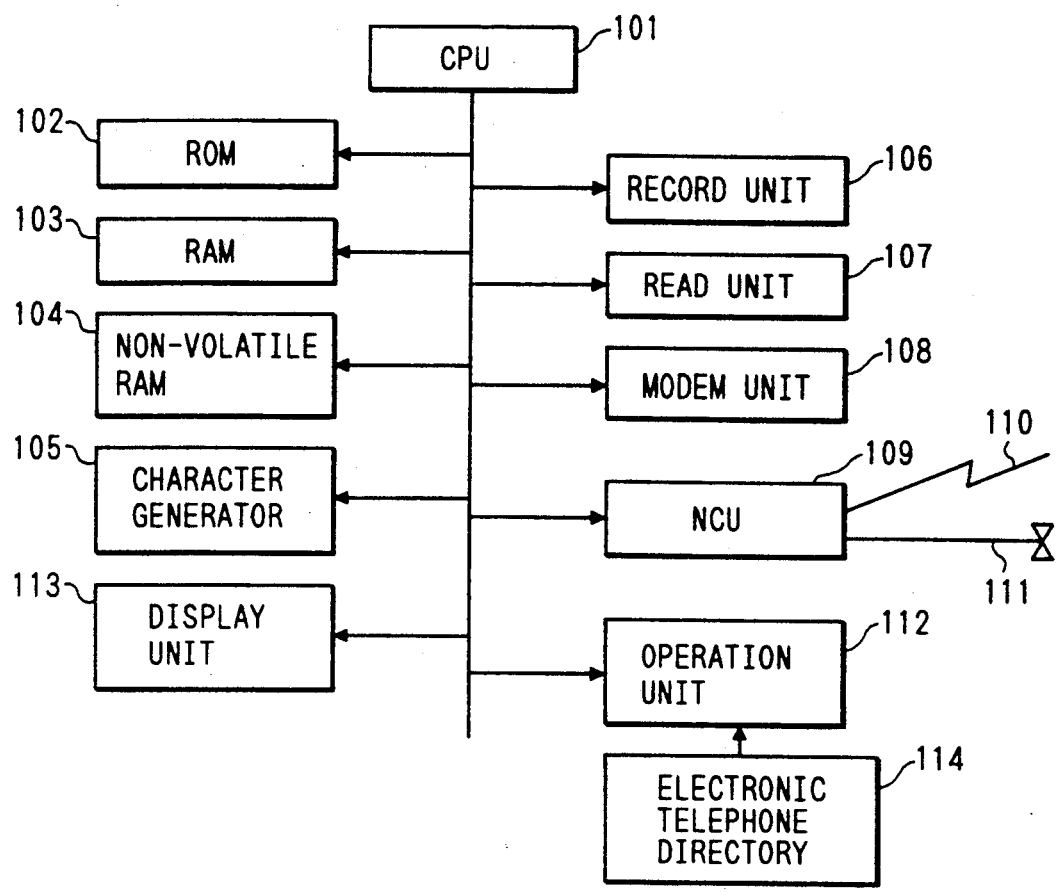
FIG. 8 is a block diagram of a facsimile apparatus according to the fifth embodiment of the present invention.

FIG. 8 is a block diagram showing a facsimile apparatus according to the fifth embodiment of the present invention.

A CPU 101 shown in FIG. 8 comprises a microprocessor, and controls the overall facsimile apparatus, i.e., a RAM 103, a non-volatile RAM 104, a character generator (CG) 105, a record unit 106, a read unit 107, a modem unit 108, a network control unit (NCU) 109, an operation unit 112, and a display unit 113 in accordance with a program stored in a ROM 102.

The RAM 103 stores binary image data read by the read unit 107 or binary image data to be recorded by the record unit 106. The stored image data is modulated by the modem unit 108, and the modulated data is output onto a telephone line 110 through the NCU 109.

The RAM 103 stores an analog waveform input from the telephone line 110 via the NCU 109 and demodulated by the modem unit 108 as binary data.

The non-volatile RAM 104 reliably stores data to be preserved when the power source of the facsimile apparatus is turned off. For example, the non-volatile RAM 104 registers destination names and destination telephone numbers input at the operation unit 112 in correspondence with each other.

The CPU 101 transmits a destination name according to an input destination telephone number to a destination receiver on the basis of the program stored in the ROM 102.

The CG 105 is a ROM for storing characters in JIS codes or ASCII codes. The CPU 101 reads out character data from the CG using 2-byte data as needed.

The record unit 106 records and outputs recording data read out from the RAM 103 as a hard copy under the control of the CPU 101.

The read unit 107 binarizes read data under the control of the CPU 101, and sequentially sends the binary data to the RAM 103. Note that an original loading state of the read unit 107 can be detected by an original sensor such as a photosensor arranged along a conveyance path of an original. An original detection signal is input to the CPU 101.

The modem unit 108 modulates transmission data stored in the RAM 103 under the control of the CPU 101, and outputs the modulated data onto the telephone line 110 via the NCU 109. The modem unit 108 receives an analog signal on the telephone line 110 via the NCU 109, demodulates and binarizes the received signal, and stores the binary data in the RAM 103.

The NCU 109 selectively connects the telephone line to the modem unit 108 and a telephone set 111 under the control of the CPU 101.

The telephone set 111 is integrated with the facsimile apparatus, and comprises a handset, a speech network, a dialer, and the like.

The operation unit 112 includes a key for starting image transmission or reception, a mode selection key for designating an operation mode, e.g., a fine, standard, automatic reception modes, and the like during transmission/reception, a dialing ten-key pad, and the like. The CPU 101 detects depression states of these keys, and controls the corresponding units according to the detected states.

The display unit 113 comprises a liquid crystal display, and displays predetermined characters and the like under the control of the CPU 101.

The electronic telephone directory 114 is connected to the operation unit 112 through an interface circuit.

Figure 9:
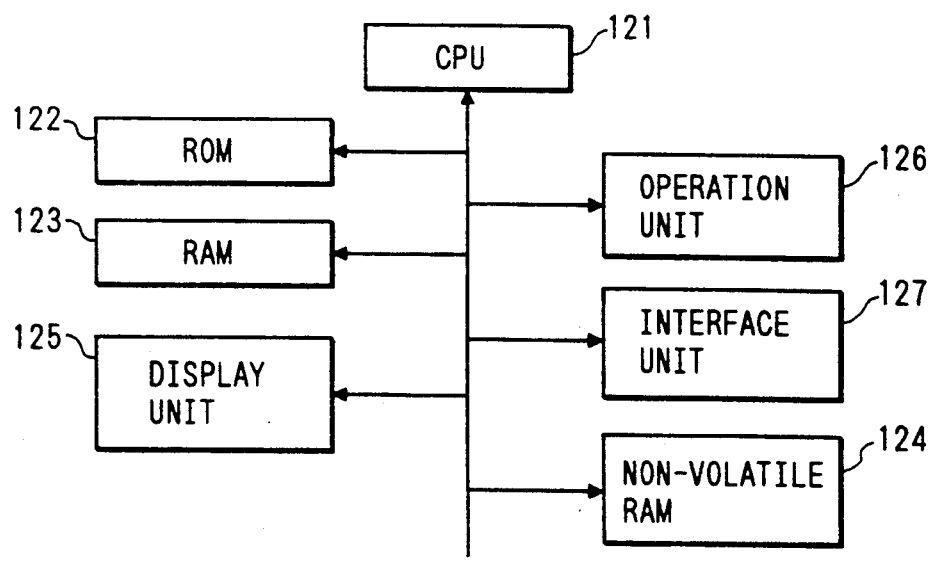
FIG. 9 is a block diagram of an electronic telephone directory according to the fifth embodiment of the present invention.

FIG. 9 is a block diagram of the electronic telephone directory. A CPU 121 controls the electronic telephone directory according to a program stored in a ROM 122. The ROM 122 also stores character codes, and the like. A non-volatile RAM 124 stores data such as telephone numbers, names, and the like. A display unit 125 comprises a liquid crystal display. An operation unit 126 is used when a user registers telephone numbers, names, and the like. An interface unit 127 interfaces with a communication apparatus to which the electronic telephone directory is attached, and comprises LEDs for performing optical communications.

Figure 10:
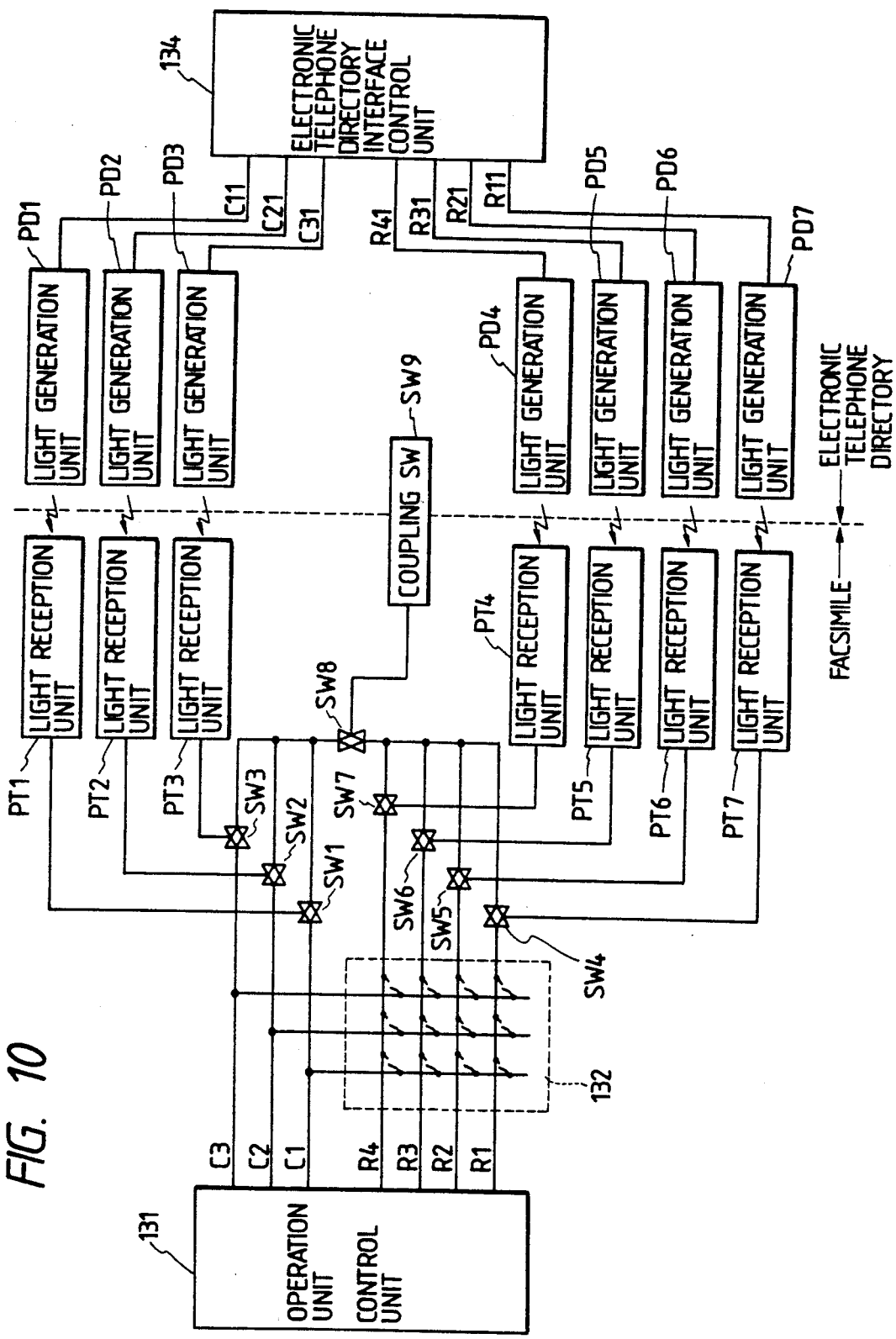
FIG. 10 is a block diagram of an interface unit according to the fifth embodiment of the present invention.

This embodiment will be described in detail below. FIG. 10 is a block diagram of an interface portion between the operation unit 112 and the electronic telephone directory 114. A control unit 131 for the operation unit 112 of the facsimile apparatus monitors depression of keys in a ten-key unit 132. A control unit 134 controls the interface unit 127 of the electronic telephone directory.

When dial signals from the electronic telephone directory interface control unit 134 are transmitted as electrical signals in a predetermined pattern through signal lines C11, C21, C31, R11, R21, R31, and R41, light generation units (PD1 to PD7) convert the corresponding electrical signals into light signals. Light reception units (PT1 to PT7) of the facsimile apparatus convert these light signals into electrical signals. Switches SW1 to SW7 decode the corresponding signals and convert them into key depression signals of these signals to the operation unit control unit 131. One of switches SW1-SW3 is operated corresponding to a column of the keypad 132 and one of the switches SW4-SW7 is operated corresponding to a row of the keypad 132 so that one of the 12 kinds of dial signals may be obtained from the switches SW1-SW7.

A switch SW9 is a coupling monitoring switch which monitors whether or not the electronic telephone directory 114 is attached to the operation unit 112. When the electronic telephone directory 114 is attached, the switch SW9 enables a switch SW8, thereby enabling the switches SW1 to SW7. In this case, the ten-key depression signals are sent to the operation unit control unit 131. When the electronic telephone directory 114 is detached, the switch SW9 disables the switch SW8. In this case, no ten-key depression signals are input from the electronic telephone directory 114 to the operation unit control unit 131 at all regardless of the enabled/disabled state of the switches SW1 to SW7. Thus, when the electronic telephone directory 114 is detached, the light reception units (PT1 to PT7) can be prevented from being erroneously operated due to external light, and wrong ten-key depression signals (dial signals) can be prevented from being input to the operation unit control unit 131.

The operation of this embodiment will be described below.

Figures 12, 13:
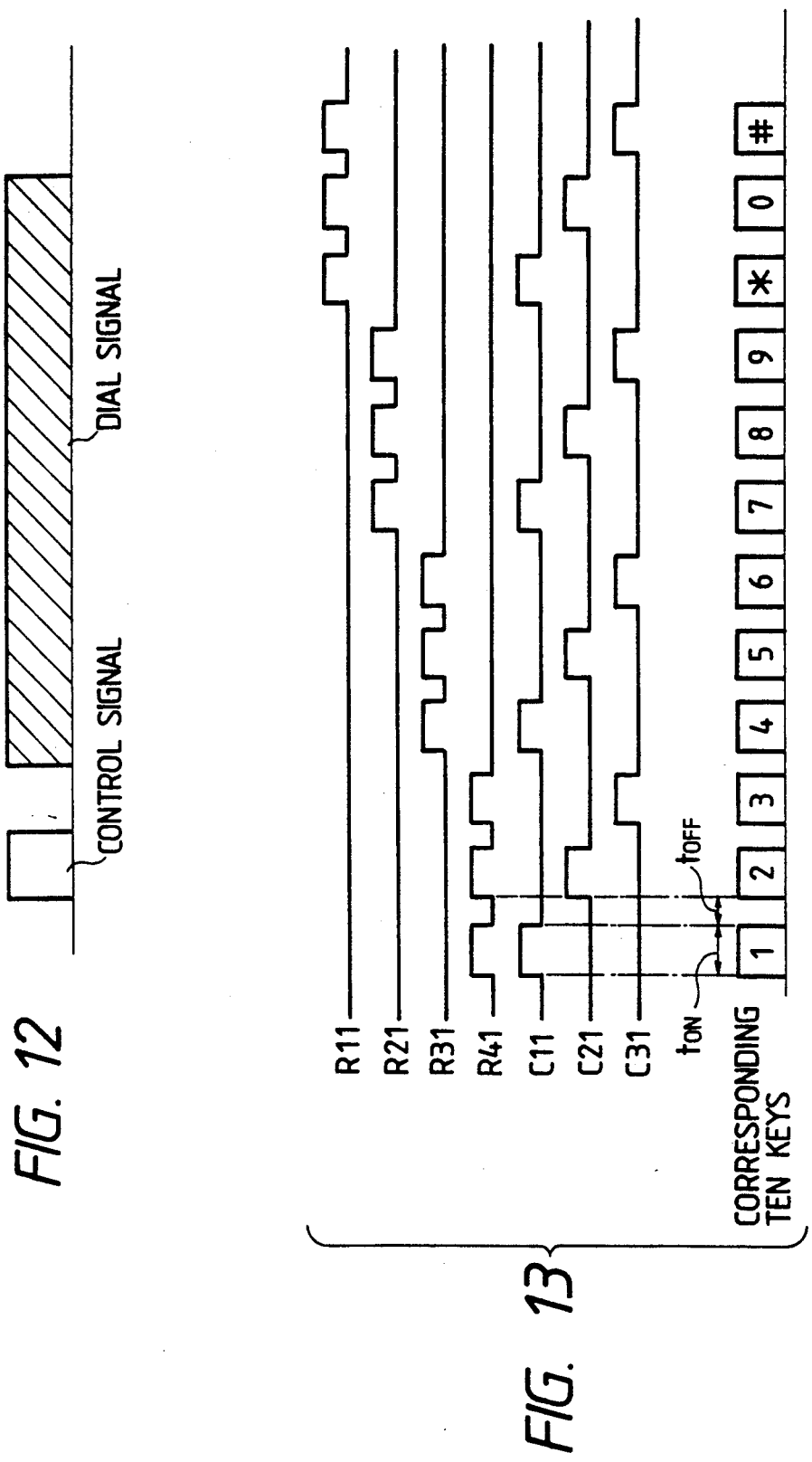
FIGS. 12 and 13 are timing charts of the fifth embodiment.

FIGS. 12 and 13 are timing charts of the electronic telephone directory. As shown in FIG. 12, the electronic telephone directory 114 transmits signals while adding a control signal before dial signals. The control signal is a specific signal consisting of # or *, and starts from # or * (in this embodiment, * is used). That is, the electronic telephone directory sends dial signals like "*03 786 8442". The dial signals are transmitted from the signal lines R11 to R41 and C11 to C31 of the electronic telephone directory interface control unit 134. As shown in the dial signal timing chart of FIG. 13, a combination of seven signals are decoded by the switches SW1 to SW7 shown in FIG. 10, and are converted into ten-key signals shown in the lower portion of FIG. 13. The ten-key signals are then input to the operation unit control unit 131. The CPU 101 of the facsimile apparatus detects these signals.

Figure 11:
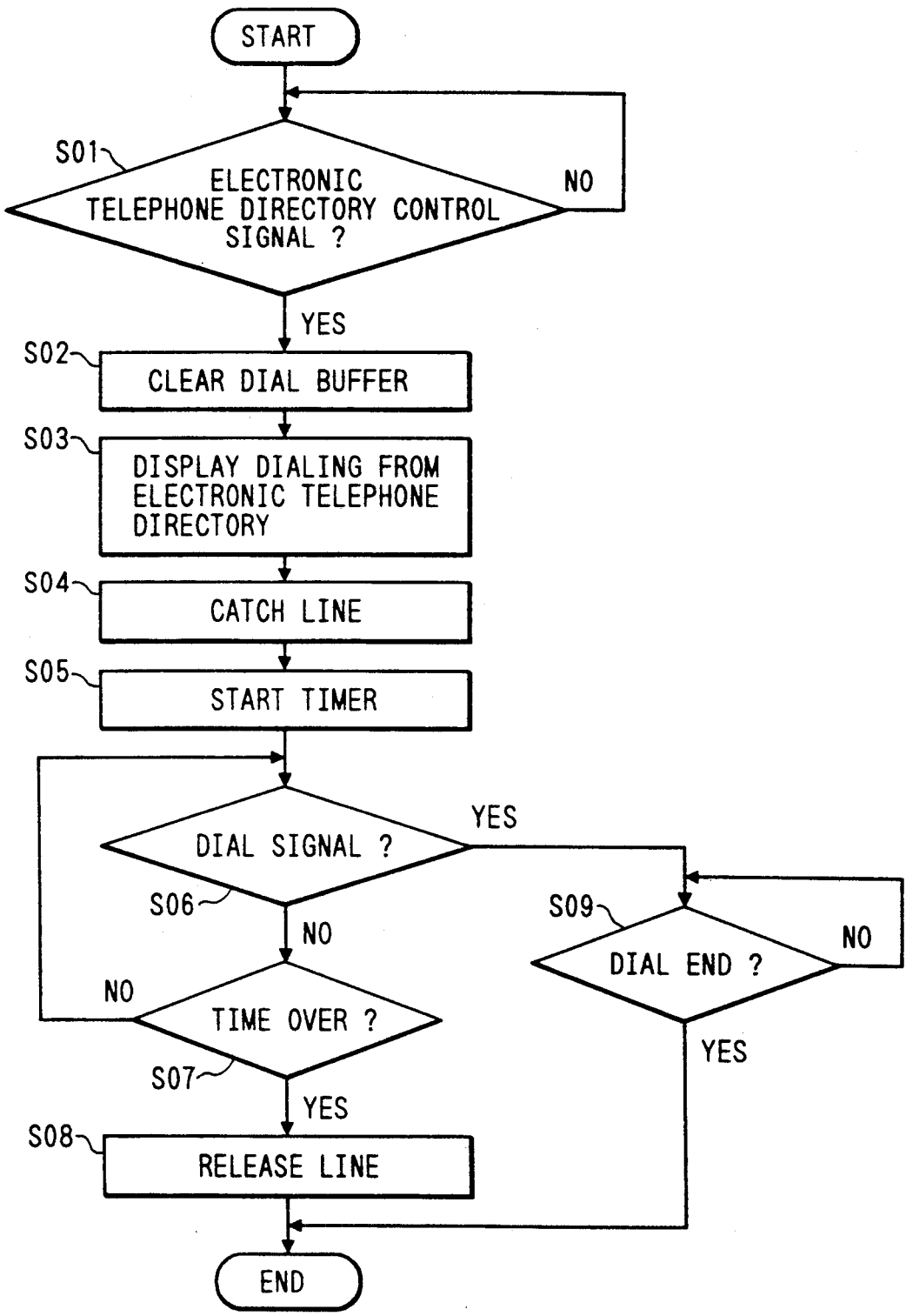
FIG. 11 is a flow chart of the fifth embodiment.

The CPU 101 of the facsimile apparatus is operated as shown in the flow chart of FIG. 11. In step S01, the CPU 101 monitors input of a control signal (*) from the electronic telephone directory 114. Upon reception of *, the CPU 101 determines start of dialing, and clears a dial buffer of the RAM 103 in step S02. In step S03, the CPU 101 causes the display unit 113 to indicate dialing from the electronic telephone directory. In step S04, the CPU 101 controls the NCU 109 to catch a line. In step S05, the CPU 101 starts an internal timer. If no dial signal is input when this timer is time up, the CPU 101 releases the line (steps S07 and S08) On the other hand, if the dial signal is detected in step S06, the CPU 101 accepts the dial signals until dialing is completed in step S09, and stores them in the dial buffer of the RAM 103. Upon reception of all the dial signals, the CPU 101 sends the dial signals from the dial buffer to the dialer of the NCU 109, thereby generating a call.

As described above, since the facsimile apparatus catches a line before the dial signals are input from the electronic telephone directory, a call can be generated when the dial signals are received. Since the dial buffer is cleared before the dial signals are input, dial information can be accurately stored in the buffer. Since the display unit 113 informs dialing from the electronic telephone directory to a user, the user can perform dialing from the electronic telephone directory.

Sixth Embodiment

When an initialization switch is depressed, an electronic telephone directory of this embodiment generates a corresponding signal. On the other hand, upon reception of the signal, a facsimile apparatus clears a dial buffer, displays a dial signal reception state, and catches a telephone line to wait for dial signals from the electronic telephone directory.

The arrangements of the facsimile apparatus and the electronic telephone directory of this embodiment are common to those shown in FIGS. 8 and 9.

Figure 14:
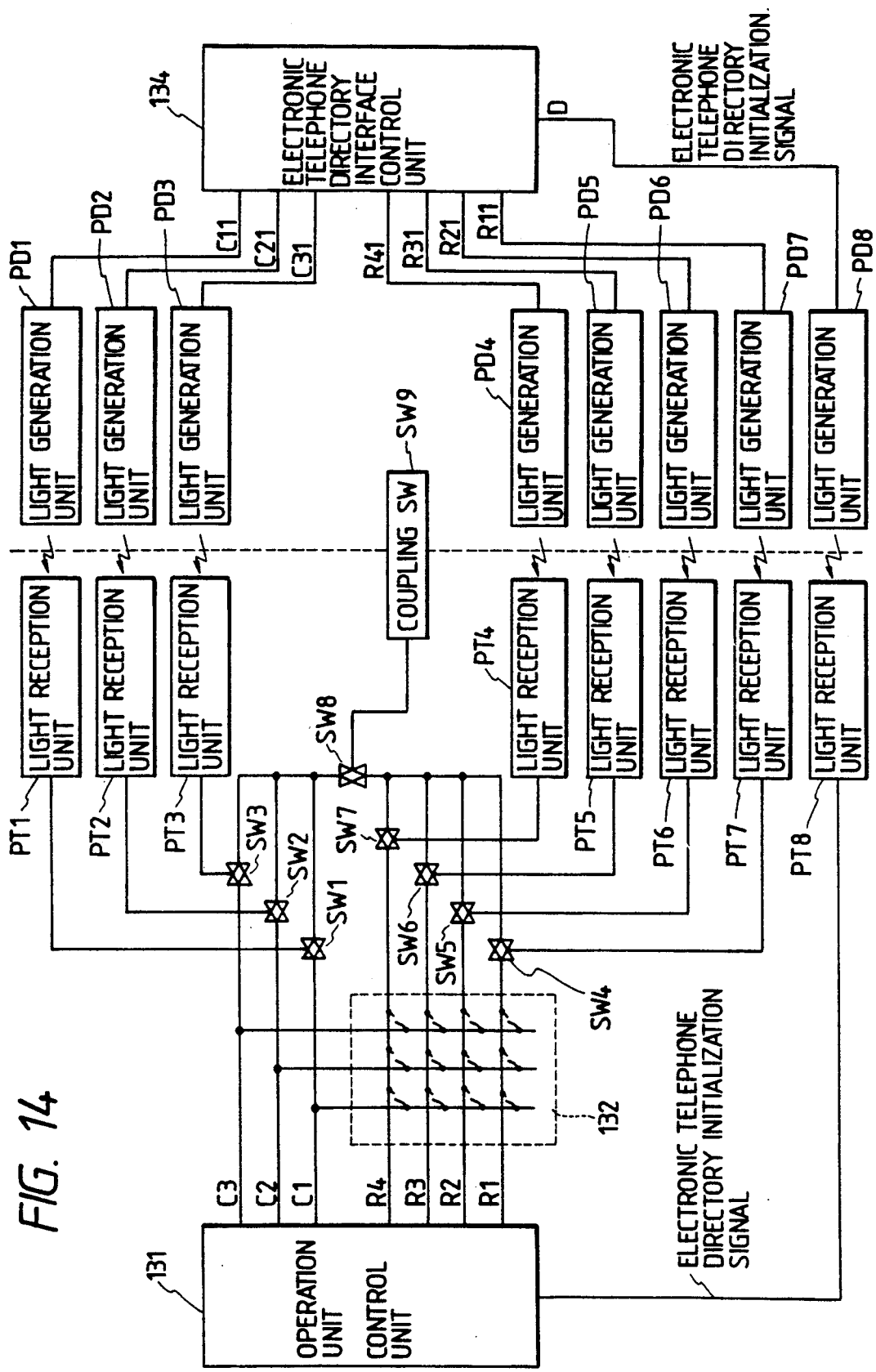
FIG. 14 is a block diagram of an interface unit according to the sixth embodiment of the present invention.

FIG. 14 shows a block diagram of an interface portion between an operation unit 112 and an electronic telephone directory 114 of this embodiment. In the block diagram of FIG. 14, an electronic telephone directory initialization signal is output from a signal line D of an electronic telephone directory interface control unit 134 to an operation unit control unit 131 through units PD8 and PT8 in addition to the arrangement shown in the block diagram of FIG. 10.

The operation of this embodiment will be described below.

FIG. 15 is a flow chart of the electronic telephone directory, and FIG. 16 is a timing chart thereof. A CPU 101 of the electronic telephone directory generates an initialization signal according to the flow chart. More specifically, when an electronic telephone directory initialization switch of an operation unit 126 of the electronic telephone directory is depressed in step S11, a CPU 121 turns on an initialization signal D in step S12. When the electronic telephone directory initialization switch is turned off in step S13, the CPU 121 turns off the initialization signal D. The relationship between the electronic telephone directory initialization switch and the initialization signal is as shown in the timing chart of FIG. 16, and thereafter, dial signals are generated. The initialization signal is output from an interface unit 127 to the communication apparatus. More specifically, the initialization signal is input from the interface control unit 134 to the operation unit control unit 131 through the units PD8 and PT8, as shown in FIG. 14.

Figure 17:
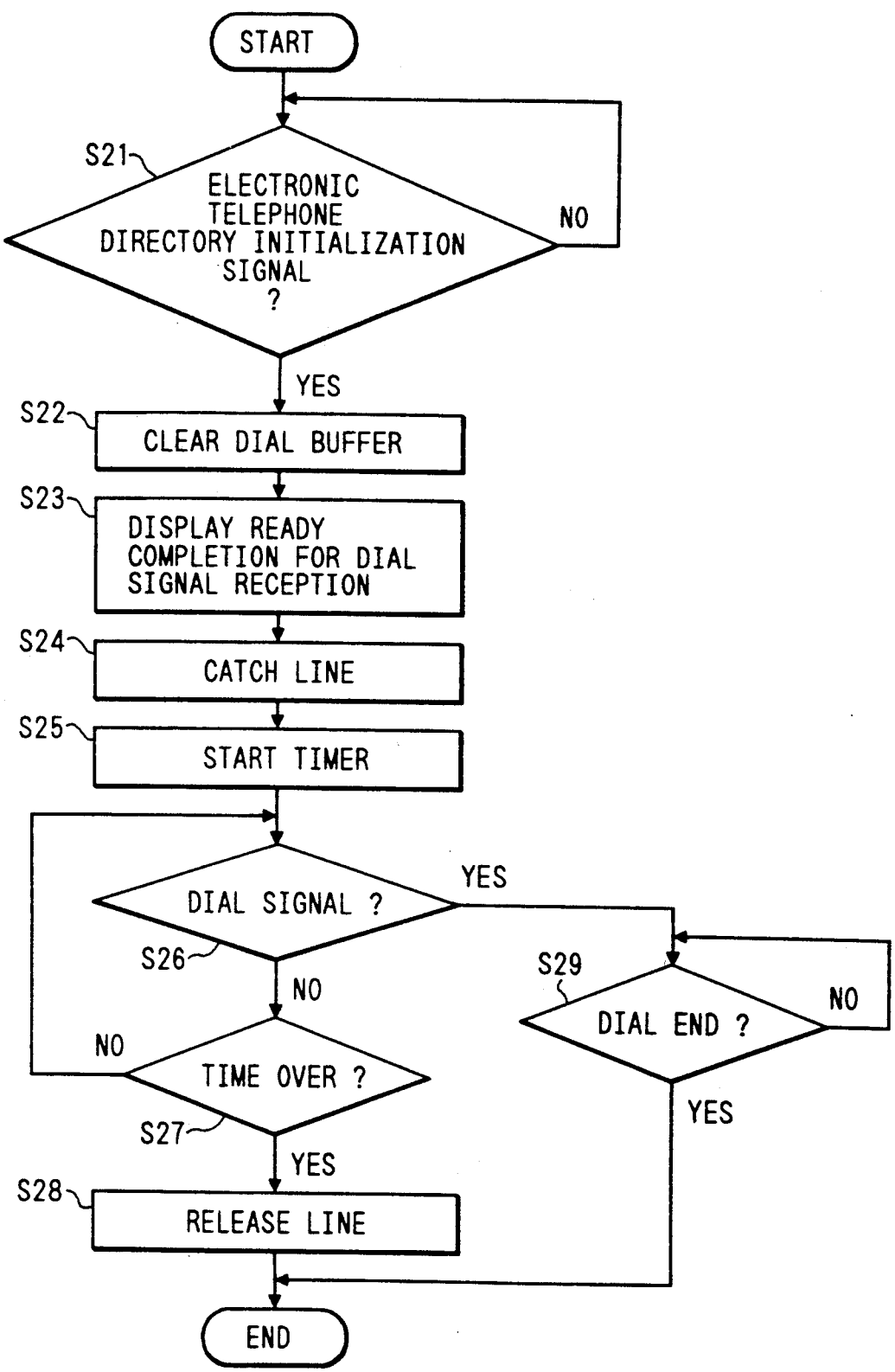
FIG. 17 is a flow chart illustrating communication processing in the sixth embodiment.

The operation of the CPU 101 of the communication apparatus will be described below. FIG. 17 is a flow chart showing this operation. The CPU 101 checks in step S21 if the operation unit control unit 131 detects the initialization signal. If YES in step S21, the CPU 101 clears the dial buffer in step S22, and causes a display unit 113 to display completion of ready processing for dial signal reception in step S23. Furthermore, the CPU 101 catches a telephone line in step S24 to prepare for the following dialing operation. The CPU 101 starts a dialing standby timer in step S25. This timer is used to release the line when no dialing operation is performed. The CPU 101 checks in step S26 if a dial signal is detected, and checks in step S27 if the timer is time over. If YES in step S26, the CPU 101 checks end of dialing in step S29. If YES in step S29, the CPU 101 ends this routine. If YES in step S27, the CPU 101 releases the line in step S28.

As described above, the facsimile apparatus can catch a line before dial signals are input from the electronic telephone directory. Since the dial buffer is cleared before the dial signals are input, accurate dial information can be stored in the buffer. Since a dial information acceptable state can be signalled to a user, the user can dial from the electronic telephone directory after the facsimile apparatus is ready to accept the dial information. Thus, data exchange can be accurately performed.

The facsimile apparatus of the fifth and sixth embodiments catches a line upon reception of a control signal from the electronic telephone directory, but may catch a line upon reception of a telephone number from the electronic telephone directory. In this case, the CPU 101 sequentially stores the received telephone number from the start address of the dial memory. Upon completion of reception of the telephone number, the CPU 101 catches a line, and sends dial signals according to the received telephone number.

Seventh Embodiment

An electronic telephone directory of this embodiment sends a signal corresponding to a clear key to a facsimile apparatus, and the facsimile apparatus resets the system upon detection of this signal.

The arrangements of the facsimile apparatus and the electronic telephone directory of this embodiment are common to those shown in FIGS. 8 and 9.

Figure 18:
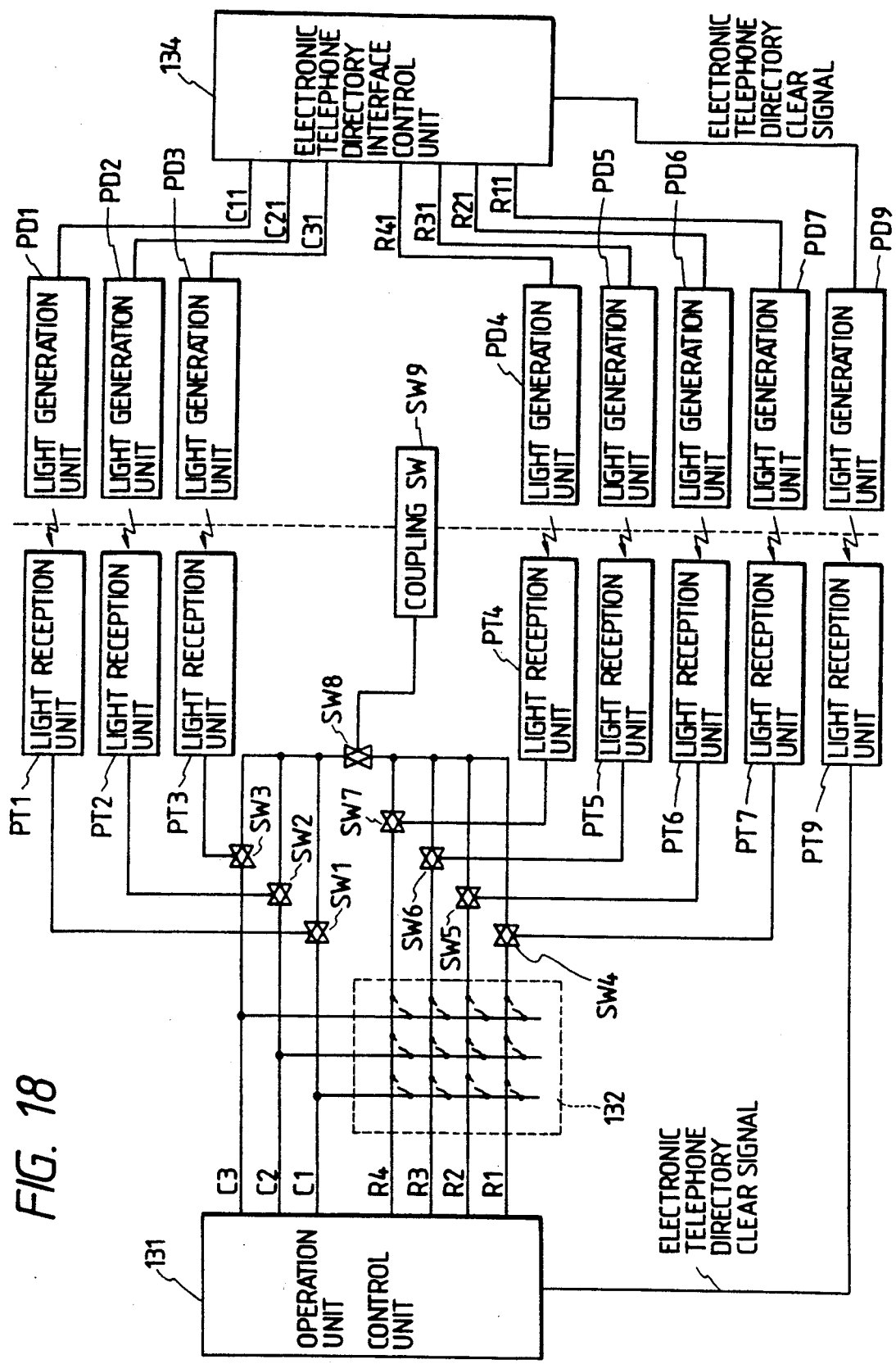
FIG. 18 is a block diagram of an interface unit according to the seventh embodiment of the present invention.

FIG. 18 is a block diagram of an interface portion between an operation unit 112 and an electronic telephone directory 114 of this embodiment. In the block diagram shown in FIG. 18, an electronic telephone directory interface control unit 134 outputs a clear signal of the electronic telephone directory to an operation unit control unit 131 through units PD9 and PT9 in addition to the arrangement shown in the block diagram of FIG. 10.

The operation of this embodiment will be described below.

FIG. 19 is a flow chart of the facsimile apparatus, and FIG. 20 is a timing chart of the electronic telephone directory. As shown in the timing chart of FIG. 20, when a clear key on an operation unit 126 of the electronic telephone directory is depressed, a CPU 121 sends a clear signal to the operation unit control unit 131 through the interface control unit 134 in response to the key operation. A CPU 101 of the facsimile apparatus monitors this clear signal in step S31 in FIG. 19. Upon detection of the clear signal, the CPU 101 resets the system in step S32. In this case, if a line has been acquired, the line is released, and the dial buffer is cleared.

As described above, since a clear key depression signal of the electronic telephone directory is supplied to the facsimile apparatus, a dialing error can be prevented when the clear key is depressed during data transfer from the electronic telephone directory to the facsimile apparatus.

As described above, in this embodiment, dial signals are generated on the basis of information generated by the electronic telephone directory. Therefore, a call can be accurately generated. Furthermore, in this embodiment, since not only a dial number but also control information are received from the electronic telephone directory, a call can be generated from the electronic telephone directory by utilizing various functions of the communication apparatus.

Eighth Embodiment

The arrangements of a facsimile apparatus and an electronic telephone directory of this embodiment are common to those shown in FIGS. 8 and 9.

Figure 22:
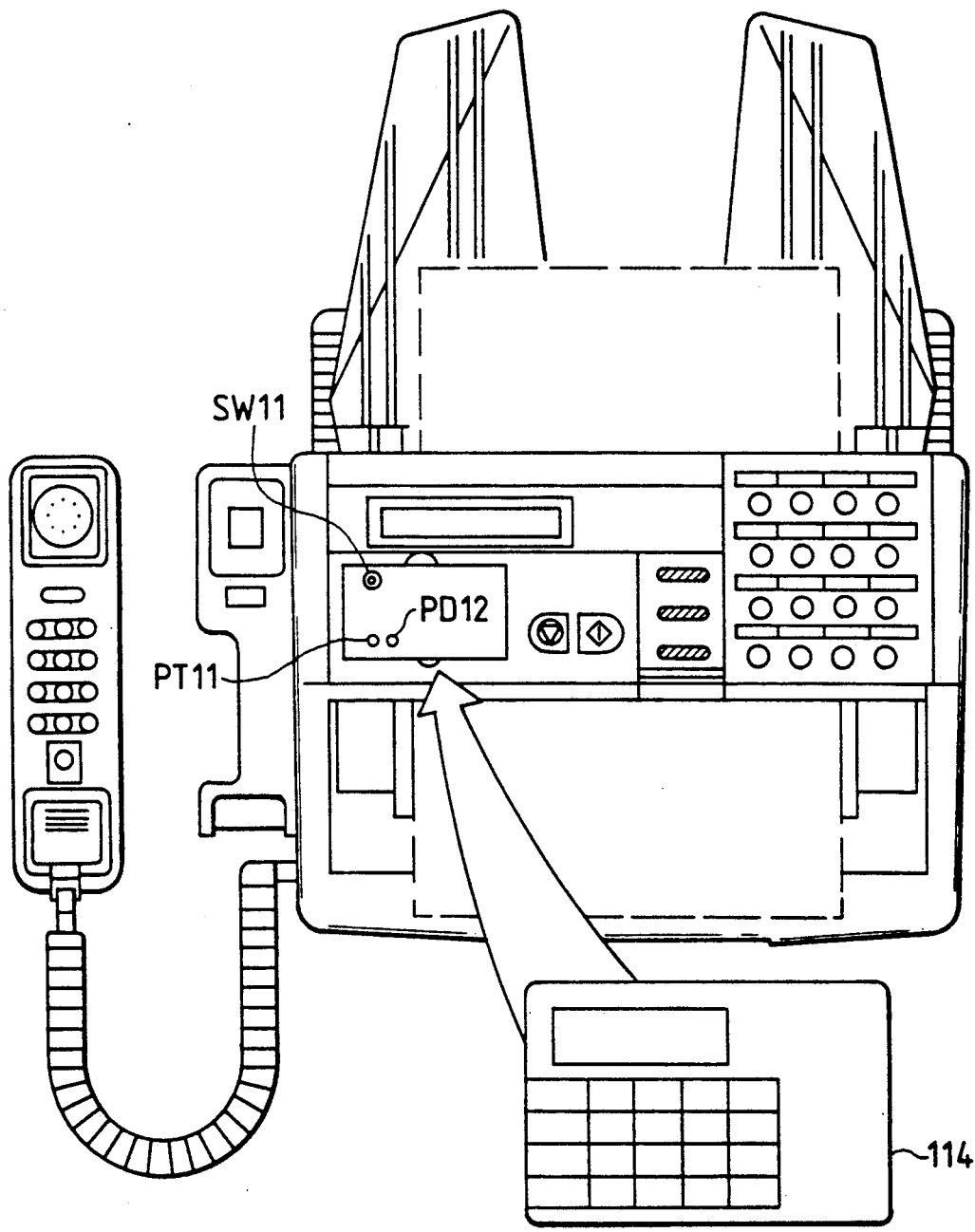
FIG. 22 is a plan view of a facsimile apparatus and an electronic telephone directory according to the ninth embodiment of the present invention.

More specifically, a portable electronic telephone directory 114 is attached to an operation unit 112. The electronic telephone directory 114 is formed into a relatively thick card-like shape, and has, on its upper surface, a liquid crystal display unit 125 for displaying a destination and its telephone number, and various touch keys 126 for switching a display on the display unit and inputting data. The electronic telephone directory 114 is attached to an electronic telephone directory mounting portion of the operation unit 112, as shown in FIG. 22. When a transfer button of the electronic telephone directory 114 is depressed in an attached state, telephone number information which is being displayed on the liquid crystal display unit 125 is transferred to the operation unit 112.

The electronic telephone directory mounting portion is formed to have a relatively rectangular recess in correspondence with the low-profile shape of the electronic telephone directory 114, and receives the electronic telephone directory 114 to place it thereon.

Therefore, as compared to a case wherein information is transferred in a card insertion state like in a conventional IC card, the electronic telephone directory 114 can be easily attached/detached, and a user can operate a transfer button or other keys while observing the display unit 125 arranged on the upper surface of the electronic telephone directory 114.

A plurality of light generation units are arranged on the lower surface of the electronic telephone directory 114 attached to the electronic telephone directory mounting portion in this state. On the other hand, light reception units corresponding to the light generation units are arranged on the mounting surface of the electronic telephone directory mounting portion. More specifically, in this embodiment, signal transfer is performed in a non-contact manner using photocouplers as a combination of these light generation units and light reception units.

Figure 21:
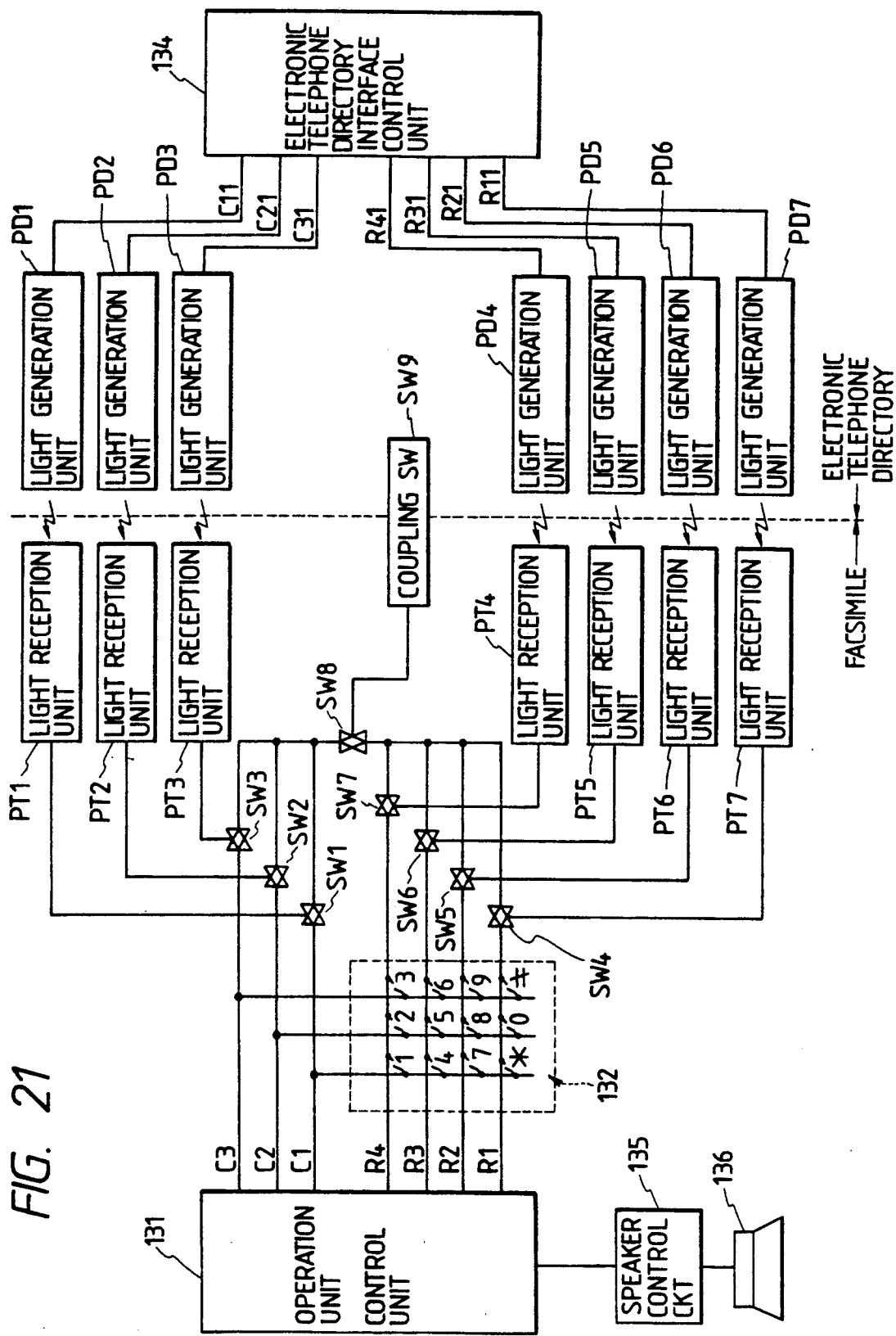
FIG. 21 is a block diagram of an interface unit according to the eighth embodiment of the present invention.

FIG. 21 is a block diagram showing an arrangement of an interface portion between the electronic telephone directory 114 and the operation unit 112.

The electronic telephone directory 114 has seven light generation units PD1 to PD7 each comprising a photodiode, and the electronic telephone directory mounting portion of the operation unit 112 has seven light reception units PT1 to PT7 each comprising a phototransistor.

An interface control unit 134 in the electronic telephone directory 114 selectively outputs output signals C11 to C31 and R11 to R41 to the light generation units PD1 to PD7, thereby controlling switches SW1 to SW7 through the light generation units PD1 to PD7 and the light reception units PT1 to PT7. Thus, the switches SW1 to SW7 decode the output signals C11 to C31 and R11 to R41, and input the decoded signals to the control unit 131 of the operation unit 121 as key depression signals at a ten-key unit 132.

More specifically, an operator operates the ten-key unit 132 to selectively connect signal lines of time-divisional signals C11 to C31 and those of key depression signals R11 to R41. The control unit 131 time-divisionally monitors input of the key depression signals R11 to R41, and determines depressed keys. In place of the ten-key unit 132, the signal lines are selectively connected by the switches SW1 to SW7 to allow dial inputs in the same manner as normal ten-key inputs.

The electronic telephone directory mounting portion has a coupling switch SW9 for detecting a coupled state of the electronic telephone directory 114. When the coupling switch SW9 enables a switch SW8 and when the electronic telephone directory 114 is attached, the time-divisional signals C11 to C31 are supplied to the switches SW4 to SW7 of the key depression signals R11 to R41, thus allowing the above-mentioned dial inputs. In this embodiment, the dial inputs can be performed when the electronic telephone directory 114 is attached. Therefore, erroneous operations of the light reception units PT1 to PT7 due to external light can be prevented when the electronic telephone directory 114 is detached.

The operation unit 112 comprises a speaker control circuit 135 for outputting depression sounds according to dial inputs to the control unit 131, and a speaker 136. More specifically, the operation unit control unit 131 sends a key depression sound instruction signal to the speaker control circuit 135, and causes the speaker 136 to generate key depression sound corresponding to input dials.

In the above arrangement, when a call is generated using the electronic telephone directory 114, a display state of the liquid crystal display unit 125 is switched while the electronic telephone directory 114 is attached to the electronic telephone directory mounting portion or before the electronic telephone directory 114 is attached thereto, and a destination to be called and its telephone number are searched and called.

When the transfer button is depressed while the electronic telephone directory 114 is mounted on the electronic telephone directory mounting portion, the telephone number displayed on the liquid crystal display unit 125 is sequentially transferred to the operation unit 112, and is then supplied from the operation unit 112 to the CPU 101.

Upon transfer of the telephone number, key depression sounds are sequentially output from the speaker 136. Since the key depression sounds are common to those when a ten-key pad is normally operated, a user can determine that the telephone number input from the electronic telephone directory 114 is accurately received by the operation unit 112. When the key depression sounds end, the user can recognize end of transfer of the telephone number.

Note that the electronic telephone directory may generate a call from a communication apparatus other than the facsimile apparatus. Data transfer may be performed not in an optical system but in an electrical system. In addition to the above arrangement, a telephone number or a message indicating end of transfer received from the electronic telephone directory 114 may be displayed on a main apparatus, so that a user can check it.

As described above, when telephone number information is input from the electronic telephone directory to the main apparatus, the main apparatus generates key depression sounds common to those when a ten-key pad is operated. Thus, a user can easily determine that telephone number information is accurately transferred to the main apparatus.

Ninth Embodiment

FIG. 22 is a plan view of a facsimile apparatus and an electronic telephone directory according to this embodiment. The arrangements of the facsimile apparatus and the electronic telephone directory are common to those shown in FIGS. 8 and 9.

A light generation unit and a light reception unit are arranged on the lower surface of an electronic telephone directory 114 attached to the electronic telephone directory mounting portion in this state. A light reception unit PT11 and a light generation unit PD12 corresponding to the above-mentioned elements are arranged on the mounting surface of the electronic telephone directory mounting portion. In this embodiment, signal transfer is performed in a non-contact manner using photocouplers as a combination of these light generation units and light reception units.

FIG. 23 is a block diagram showing an arrangement of an interface portion between the electronic telephone directory 114 and an operation unit 112.

The electronic telephone directory 114 has a light generation unit PD11 comprising a photodiode, and a light reception unit PT12 comprising a phototransistor. The light generation unit PD11 comprising a phototransistor and the light reception unit PT12 comprising a photodiode are arranged on the electronic telephone directory mounting portion of the operation unit 112.

The light generation unit PD11 and the light reception unit PT11 oppose each other. Light pulses from the light generation unit PD11 are received by the light reception unit PT11, so that information is transferred from the electronic telephone directory 114 to the operation unit 112. The light reception unit PT12 and the light generation unit PD12 also oppose each other. Light pulses from the light generation unit PD12 are received by the light reception unit PT12, so that information is transferred from the operation unit 12 to the electronic telephone directory 114.

Note that the light generation unit PD11 is controlled by a control unit 144 of the electronic telephone directory 114, and the light generation unit PD12 is controlled by a control unit 141 of the operation unit 112. The output from the light reception unit PT12 is monitored by the control unit, and the output from the light reception unit PT11 is monitored by the control unit 141.

A coupling switch SW11 for detecting a mounting state of the electronic telephone directory 114 is arranged on the electronic telephone directory mounting portion of the operation unit 112, and a coupling switch SW12 for detecting that the electronic telephone directory is mounted on the electronic telephone directory mounting portion is also arranged on the electronic telephone directory 114. The states of these coupling switches SW11 and SW12 are monitored by the control units 114 and 141, respectively.

Figure 25:
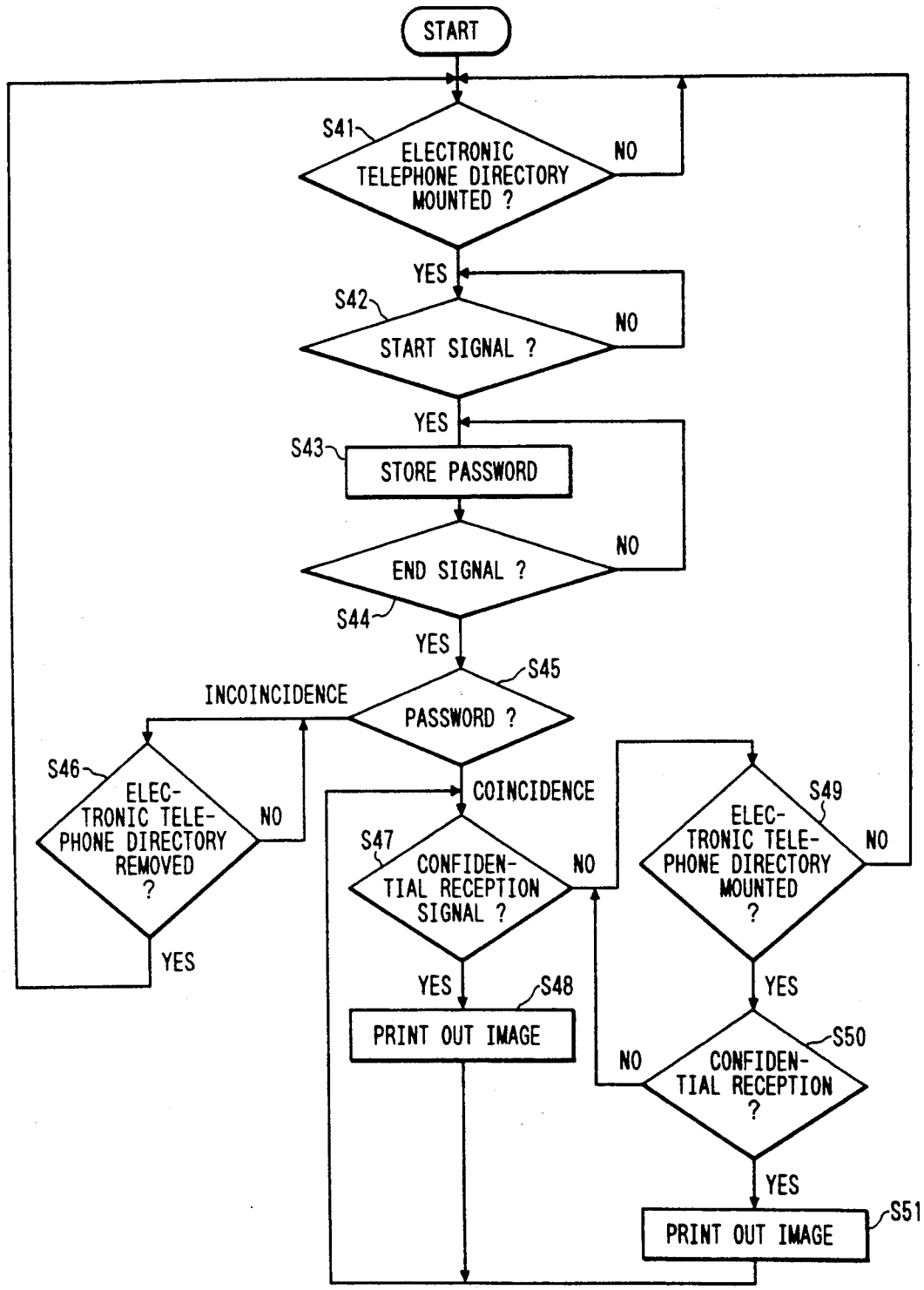
FIG. 25 is a flow chart of the ninth embodiment.
Figure 26:
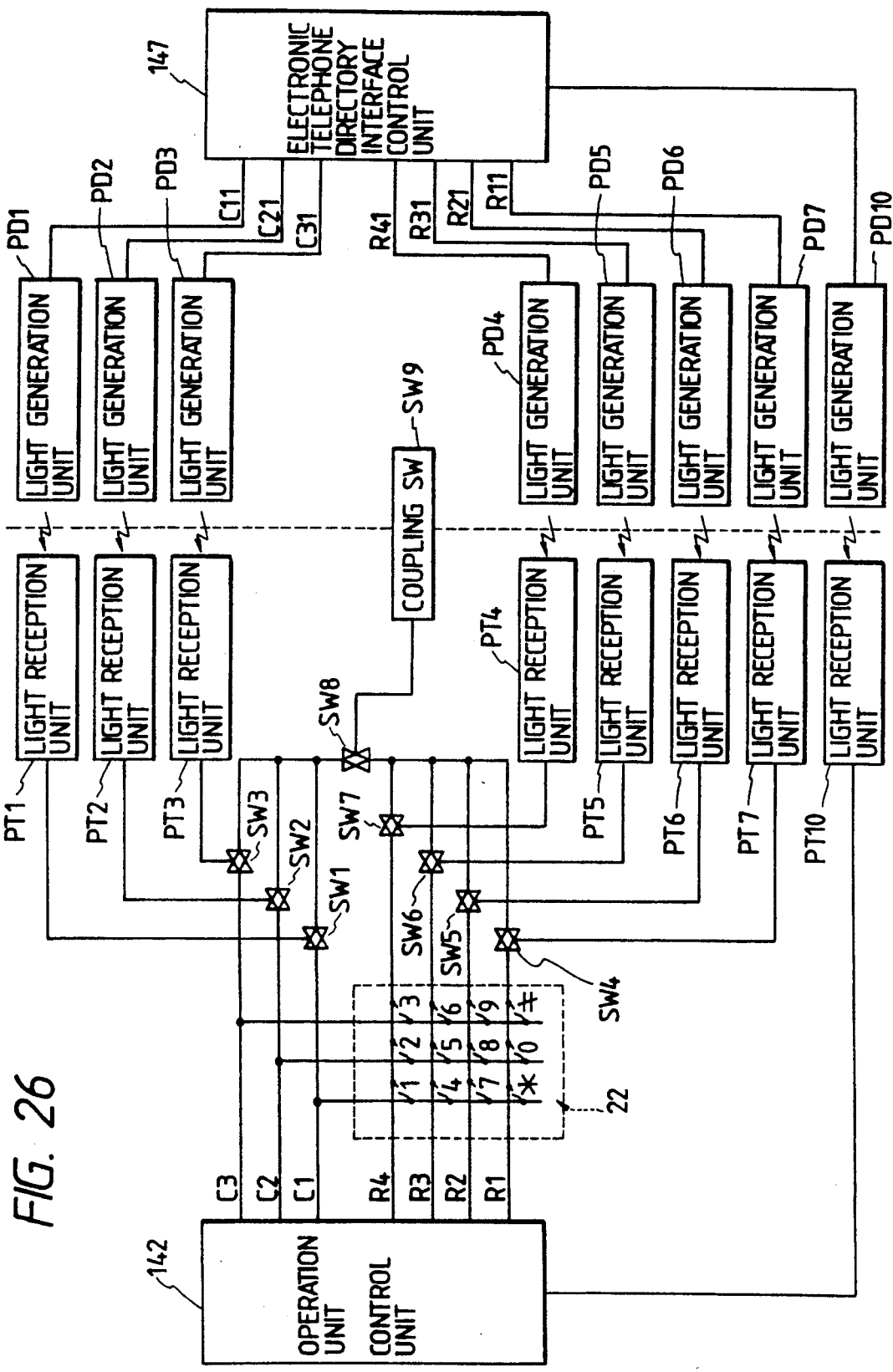
FIG. 26 is a block diagram of an interface unit according to the tenth embodiment of the present invention.

FIG. 25 is a flow chart showing an operation when the electronic telephone directory 114 is mounted on the electronic telephone directory mounting portion.

The operation unit control unit 141 monitors the coupling switch SW11. When the electronic telephone directory 114 is mounted (S41), the control unit 141 waits for signal inputs from the electronic telephone directory 114 (S42).

Meanwhile, when the electronic telephone directory interface control unit 144 detects based on the switch SW12 that the electronic telephone directory is mounted on the mounting portion, it sequentially transfers a start signal, a password signal, and an end signal, as shown in FIG. 24. Of these signals, the password signal instructs output of an image which is confidentially received by the facsimile apparatus.

The operation unit control unit 141 detects upon reception of the start signal that the password signal is input next, and stores the password signal in a RAM 103 (S43). Upon reception of the end signal, the control unit 141 completes a reception operation of the password (S44).

A CPU 101 collates the received password and a password registered in advance in the facsimile apparatus. When a coincidence is detected between the two passwords (S45), if there is an already confidentially received image corresponding to this password (S47), a record unit 106 outputs the image (S48). If there is no confidentially received image, it is checked if the electronic telephone directory 114 is mounted (S49), and confidential reception is waited (S50). If confidential reception is performed while the electronic telephone directory of the coinciding password is set, the corresponding image is output (S51).

If a coincidence between the two passwords cannot be detected in step S45, the flow returns to step S41 after the electronic telephone directory 114 is detached (S46).

In the above arrangement, when a call is generated using the electronic telephone directory 114, a display state of a liquid crystal display unit 125 is switched while the electronic telephone directory 114 is attached to the electronic telephone directory mounting portion or before the electronic telephone directory 114 is attached thereto, and a destination to be called and its telephone number are searched and called. When a transfer button is depressed while the electronic telephone directory 114 is mounted on the electronic telephone directory mounting portion, the telephone number displayed on the liquid crystal display unit 125 is sequentially transferred to the operation unit 112, thus automatically generating a call.

When a telephone number or the like is displayed on the display unit 125 before the electronic telephone directory 114 is set on the mounting portion, the control unit 144 of the electronic telephone directory may output the displayed telephone number or the like from the light generation unit PD11 when the coupling switch is turned on. In this case, an operator need not depress the transfer button.

The electronic telephone directory of this embodiment may be applied to a computer, a copying machine, and the like which restrict use according to passwords, in addition to an output operation of confidential reception of the facsimile apparatus. A confidential password may be transferred from an electronic telephone directory which employs a transfer system other than an optical system.

In this embodiment, a user registers a password for instructing output of an image which is confidentially received by a communication apparatus in a portable storage medium, and when he or she sets this storage medium on the communication apparatus, the password can be input and collated. Therefore, each user can effectively manage a password, and an output operation of a confidentially received image can be easily instructed.

Tenth Embodiment

The arrangements of a facsimile apparatus and an electronic telephone directory of this embodiment are common to those shown in FIGS. 8 and 9.

As shown in FIG. 13, in this embodiment, two of light generation units PD1 to PD7 of photocouplers are always turned on in response to any ten-key input. An ON time $t_{on}$ and an OFF time $t_{off}$ of the light generation units PD1 to PD7 are predetermined.

A photocoupler constituted by a light generation unit PD10 and a light reception unit PT10 transfers an initialization signal and an end signal from an electronic telephone directory 114 to an operation unit 112. In this embodiment, as shown in FIG. 27, the initialization signal is sent prior to transmission of telephone number information, and the end signal is transmitted upon completion of transfer of the telephone number information.

Therefore, after the initialization signal is input, the operation unit 112 monitors signal inputs by means of the light generation units PD1 to PD7 and light reception units PT1 to PT7 to accept input of telephone number information, and sequentially stores an input number in a RAM 103.

In this case, if a correct number is input, the ON time $t_{on}$ of the photocouplers reaches a predetermined time. This state is monitored by a CPU 101 of the facsimile apparatus, thus determining a correct input or an erroneous input.

FIG. 28 is a flow chart for explaining an operation when a call is generated using the electronic telephone directory 114 with the above arrangement.

When a call is generated using the electronic telephone directory 114, a display state of a liquid crystal display unit 125 is switched while the electronic telephone directory 114 is mounted on the electronic telephone directory mounting portion or before the electronic telephone directory 114 is mounted thereon, and a destination to be called and its telephone number are searched and called.

When a transfer button is depressed while the electronic telephone directory 114 is mounted on the electronic telephone directory mounting portion, a telephone number displayed on the display unit 125 is sequentially transferred to the operation unit 112 and is then supplied from the operation unit 112 to the CPU 101 after the initialization signal is transferred.

When the CPU 101 detects input of the initialization signal (S61), it controls an NCU 109 to catch a line, and starts an internal timer (S62). This timer is used to end a call generation operation when no telephone number information is input within a predetermined period of time.

If telephone number information is input from the electronic telephone directory 114 (S63), a correct input or an erroneous input is checked on the basis of an ON time of the photocoupler, as described above. More specifically, when an erroneous input is made due to, e.g., external light, the ON time becomes longer than a predetermined period of time, and an error can be detected.

Therefore, if the CPU 101 determines that an input signal is an error, it interrupts a dial operation, releases the line, clears a telephone number already stored in a dial buffer (RAM), and displays an error on a display unit 113 (S70).

If the CPU 101 determines that an input signal is correct, it stores the input signal, i.e., telephone number information in the dial buffer (S68). If dial end data is not detected (S69), the CPU 101 restarts the timer (S66), and the flow returns to step S63 to wait for the next input.

If the timer is time over before an input signal is detected in step S63 (S64), the CPU 101 interrupts the dial operation, releases a line, and clears a telephone number already stored in the dial buffer, thus ending processing (S65).

Note that the electronic telephone directory of this embodiment can be applied to a communication apparatus other than the facsimile apparatus.

According to this embodiment, when an ON state of the photocoupler exceeds a predetermined period of time, input information is determined as an error. Therefore, a proper transfer operation can be performed from the electronic telephone directory to an apparatus main body so that the light reception units of the photocouplers are free from the influence of external light and the like.

The preferred embodiments of the present invention have been described. However, the present invention is not limited to the arrangements of the above embodiments, and various other changes and modifications may be made within the spirit and scope of the invention.

What is claimed is:

1. A call generation apparatus into which a portable device can be set, comprising:
   detection means for detecting whether or not the portable device is set into said call generation apparatus;
   light reception means for receiving a light from the portable device; and
   control means for (i) acquiring a connection to a communication line, and (ii) sending a dial signal onto the acquired communication line, on the basis of the light received by said light reception means when the portable device is detected by said detection means as being set into said call generation apparatus.

2. An apparatus according to claim 1, further comprising display means, wherein when said control means sends the dial signal onto the acquired communication line on the basis of the light received by said light reception means, said control means causes said display means to display a message indicating the sending of the dial signal.

3. An apparatus according to claim 1, wherein said control means generates PB (Push Button) tones as the dial signal said control means sends onto the acquired communication line on the basis of the light received by said light reception means.

4. A communication system comprising:
   a portable device; and
   a communication apparatus into which said portable device can be set, said communication apparatus comprising:
   detection means for detecting whether or not said portable device is set into said communication apparatus;
   light reception means for receiving a light from said portable device; and
   control means for (i) acquiring a connection to a communication line, and (ii) sending a dial signal onto the acquired communication line, on the basis of the light received by said light reception means when said portable device is detected by said detection means as being set into said communication apparatus.

5. A system according to claim 4, further comprising display means, wherein when said control means sends the dial signal onto the acquired communication line on the basis of the light received by said light reception means, said control means causes said display means to display a message indicating the sending of the dial signal.

6. A system according to claim 4, wherein said control means generates PB (Push Button) tones as the dial signal said control means sends onto the acquired communication line on the basis of the light received by said light reception means.

7. A system according to claim 4, wherein said control means stops sending the dial signal on the basis of the light received by said light reception means.

8. A system according to claim 4, wherein said portable device comprises a memory for storing a telephone number and a name.

9. A system according to claim 8, wherein said portable device comprises an operation unit for registering the telephone number and the name into said memory.

10. A system according to claim 8, wherein said portable device comprises a display unit for displaying the telephone number and the name stored in said memory.

11. An apparatus according to claim 1, wherein said detection means comprises a mechanical switch which is turned on at a time when the portable device is set into said call generation apparatus.

12. A system according to claim 4, wherein said detection means comprises a mechanical switch which is turned on at a time when the portable device is set into said call generation apparatus.

13. An apparatus according to claim 1, wherein the light received from the portable device by said light reception means comprises dial signal information.

14. An apparatus according to claim 1, wherein the light received from the portable device by said light reception means comprises dial signal information, and wherein said control means (i) acquires the connection to the communication line, and (ii) sends the dial signal onto the acquired line, on the basis of the dial signal information.

15. An apparatus according to claim 1, wherein the light received from the portable device by said light reception means comprises a control signal superposed on dial signal information, and wherein said control means (i) acquires the connection to the communication line on the basis of the control signal, and (ii) sends the dial signal onto the acquired line on the basis of the dial signal information.

16. An apparatus according to claim 15, wherein the control signal comprises an off-hook command.

17. A system according to claim 4, wherein the light received from said portable device by said light reception means comprises dial signal information.

18. A system according to claim 4, wherein the light received from said portable device by said light reception means comprises dial signal information, and wherein said control means (i) acquires the connection to the communication line, and (ii) sends the dial signal onto the acquired line, on the basis of the dial signal information.

19. A system according to claim 4, wherein the light received from said portable device by said light reception means comprises a control signal superposed on dial signal information, and wherein said control means (i) acquires the connection to the communication line on the basis of the control signal, and (ii) sends the dial signal onto the acquired line on the basis of the dial signal information.

20. A system according to claim 19, wherein the control signal comprises an off-hook command.

* * * * *

UNITED STATES PATENT AND TRADEMARK OFFICE
CERTIFICATE OF CORRECTION

PATENT NO. : 5,276,733
DATED : January 4, 1994
INVENTOR(S) : HIROMICHI UNO ET AL.

It is certified that error appears in the above-identified patent and that said Letters Patent is hereby corrected as shown below:

COLUMN 4

Line 30, "LEDs loaded" should read --LEDs and the light reception unit when the IC card is loaded--.

COLUMN 9

Line 49, "of" should read --of the ten-key unit. The switches SW1 to SW7 then supply--.

COLUMN 10

Line 37, "S08)" should read --S08).--.

Signed and Sealed this

Twenty-seventh Day of September, 1994

Attest:

BRUCE LEHMAN

Attesting Officer

Commissioner of Patents and Trademarks